United States Patent Office 3,076,681
Patented Feb. 5, 1963

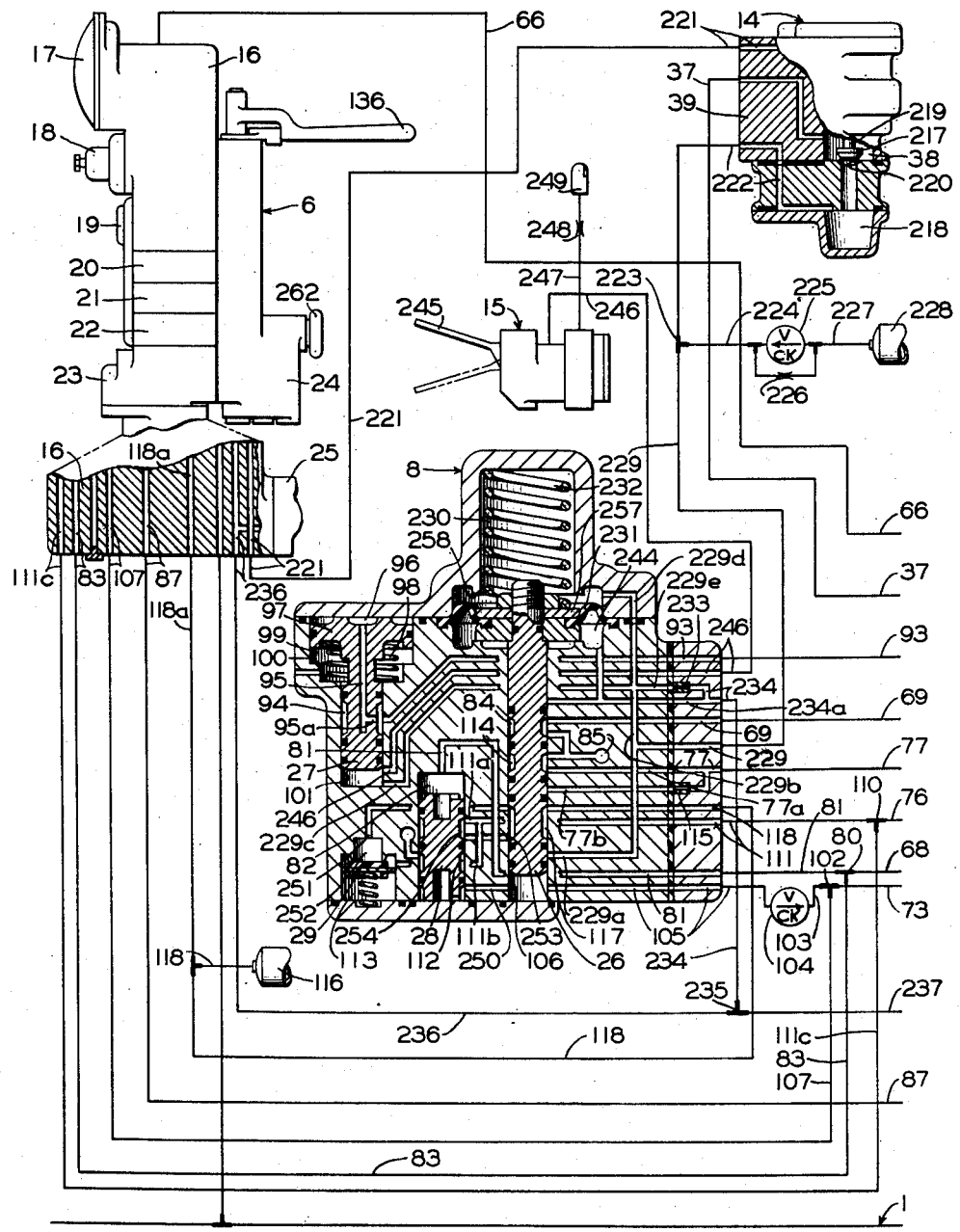

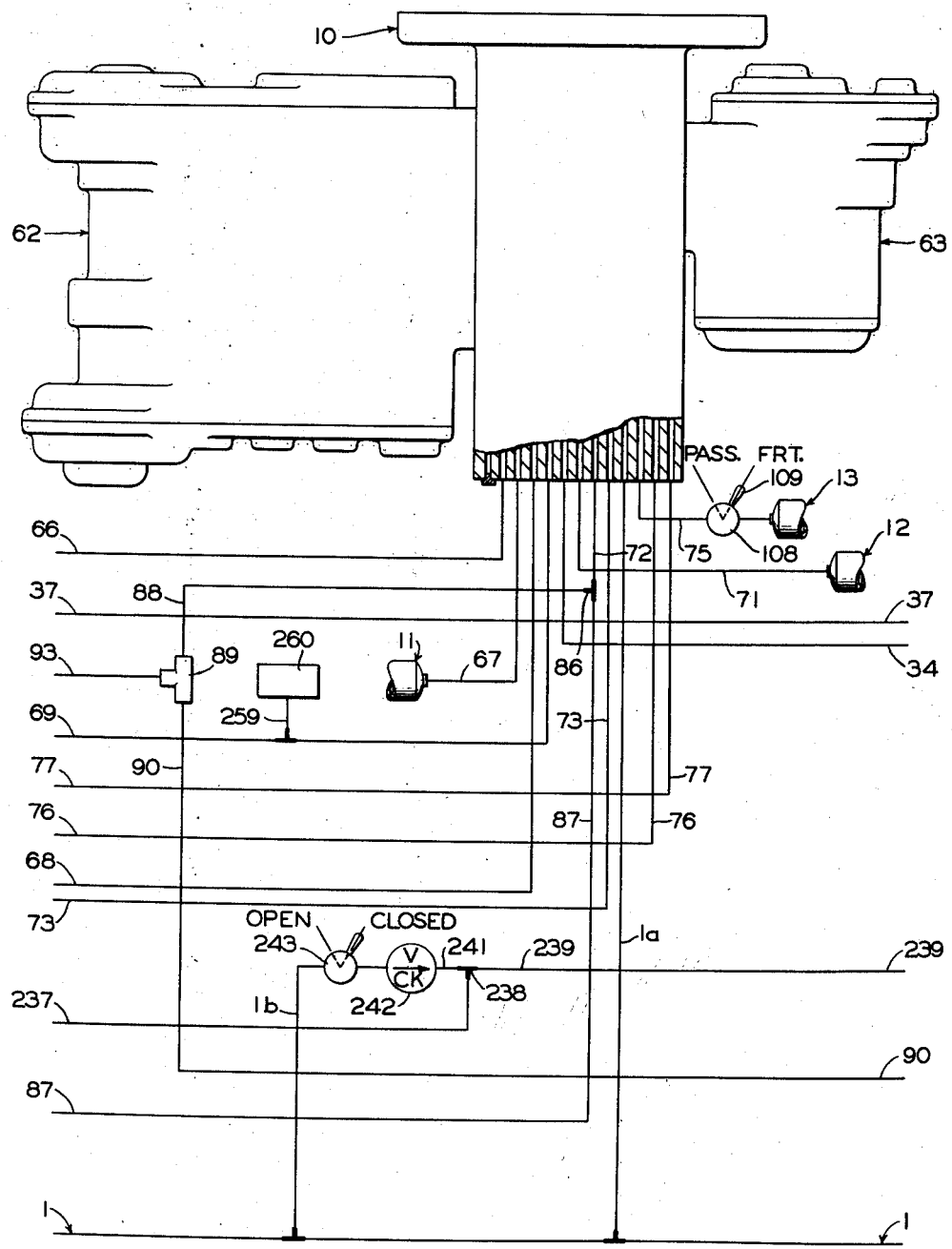

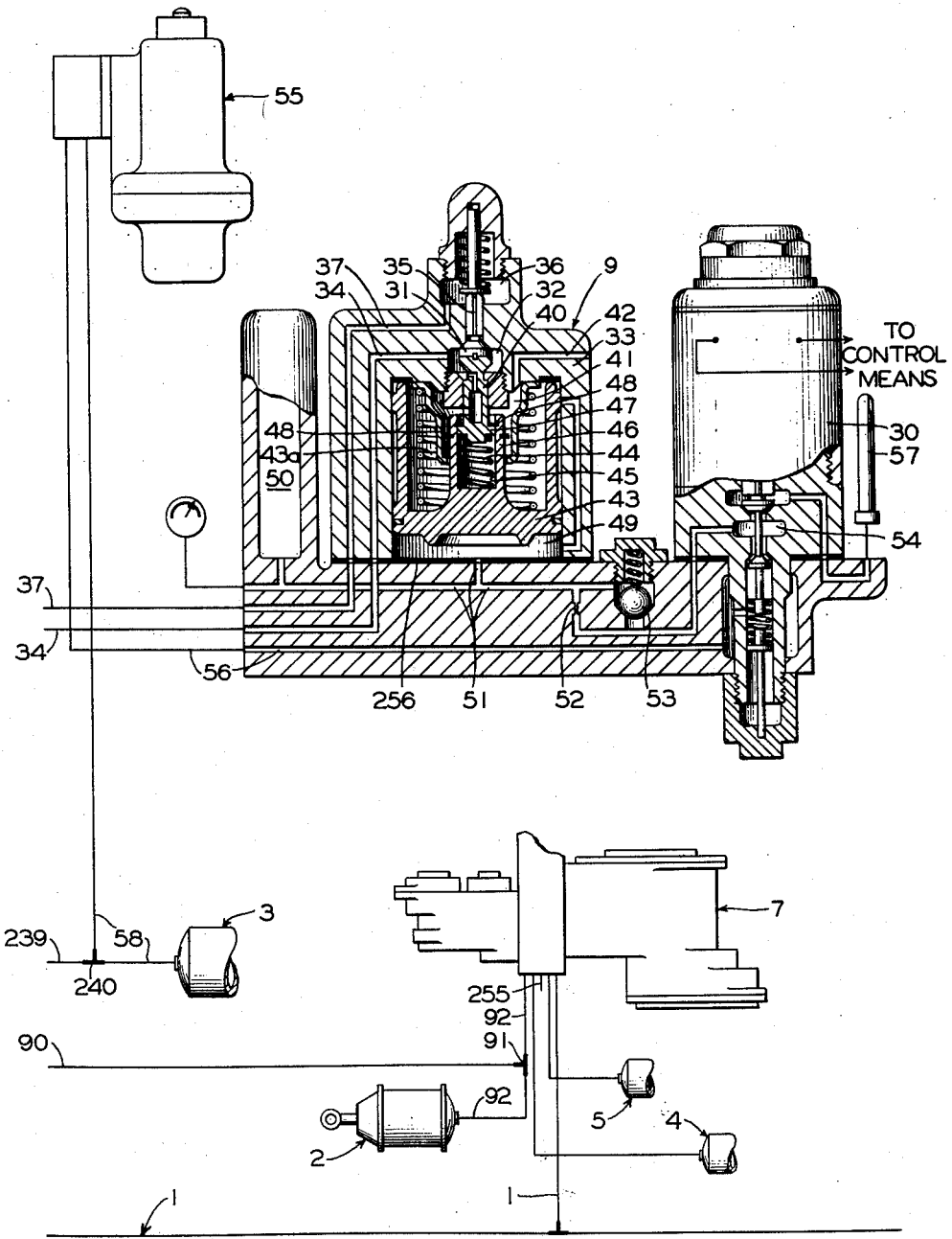

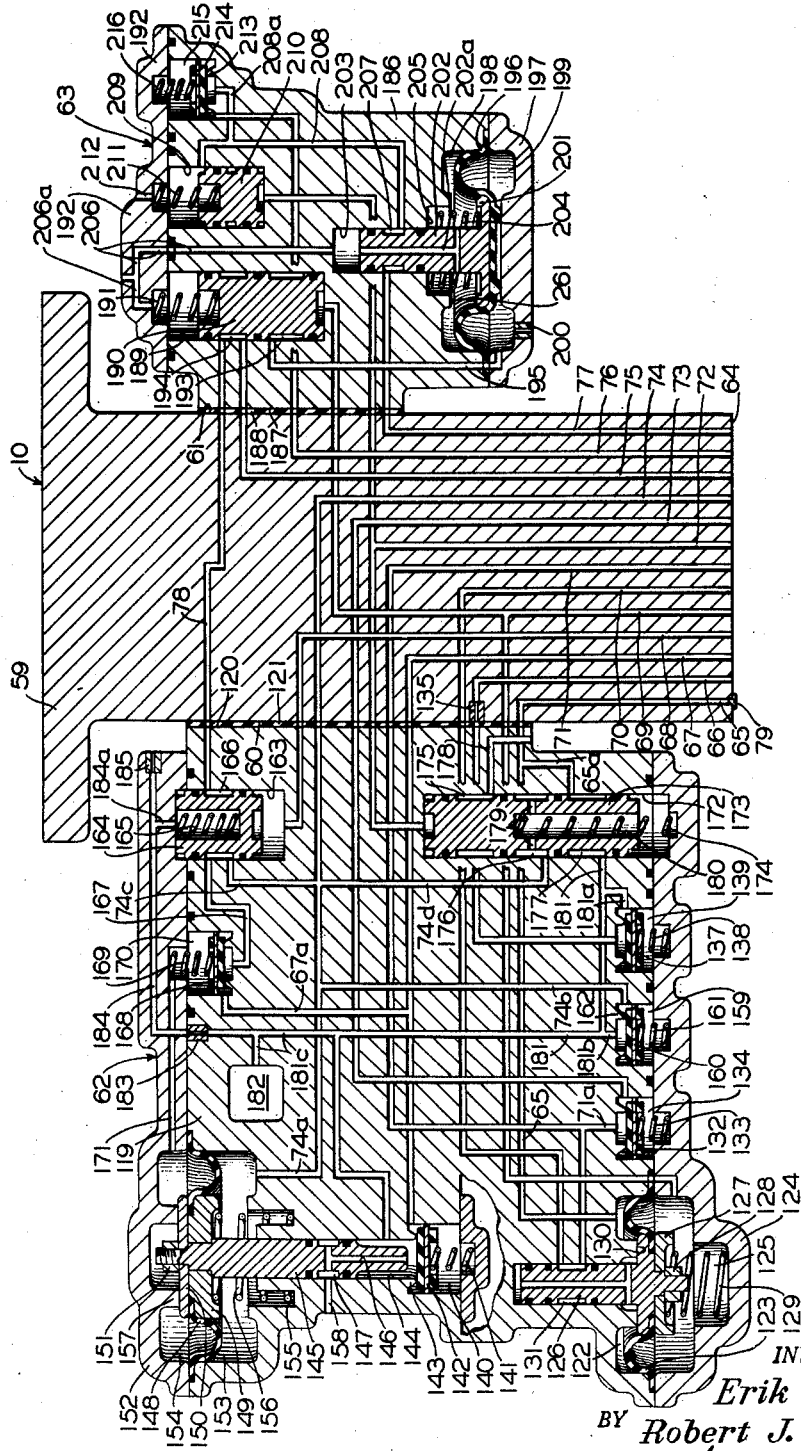

3,076,681
FLUID PRESSURE BRAKE APPARATUS WITH TEMPORARY AND PERMANENT SUPPRESSION CONTROL
Erik G. Erson, Export, and Robert J. Worbois, Irwin, Pa., assignors to Westinghouse Air Brake Company, Wilmerding, Pa., a corporation of Pennsylvania
Filed Dec. 23, 1960, Ser. No. 78,018
12 Claims. (Cl. 303—18)

This invention relates to locomotive fluid pressure brake apparatus of the type embodying an improved self-lapping type of brake valve device for providing so-called "automatic" control of brakes on a locomotive and the connected cars of a train, and, more particularly to such brake apparatus embodying means for effecting an automatic control application of brakes, sometimes referred to as a "train control" application, upon the occurrence of a predetermined control condition, for example an adverse signal condition, and means manually controlled by the engineer for either temporarily or permanently suppressing or nullifying an automatic control application of brakes on the locomotive and connected cars.

Such fluid pressure brake apparatus and improved self-lapping type of brake valve device is described and claimed in Patent No. 2,905,507, issued September 29, 1959, to Harry C. May and in Patent No. 2,958,561, issued November 1, 1960, to Harry C. May, each of which is assigned to the assignee of the present application.

There is described and claimed in Patent No. 2,322,042, issued June 15, 1943, to Glenn T. McClure, an automatic type of locomotive fluid pressure brake apparatus embodying means manually controlled by the engineer for either temporarily or permanently suppressing or nullifying an automatic control application of brakes on a locomotive and connected cars of a train. This locomotive fluid pressure brake apparatus embodies a brake valve device of the rotary valve type, the rotary valve and its seat having therein ports, cavities and passageways which cooperate with certain other devices embodied in this apparatus to provide for the engineer manually effecting either a temporary or a permanent suppression of an automatic control application of brakes on the locomotive and connected cars.

The improved self-lapping type of brake valve devices described and claimed in the above-mentioned patents of Harry C. May do not have a rotary valve and valve seat in which can be provided the necessary ports, cavities and passageways for cooperating with certain other devices, such as those shown in the above-mentioned Patent No. 2,322,042, to provide for the engineer manually effecting either a temporary or a permanent suppression of an automatic control application of brakes.

Accordingly, it is the general purpose of this invention to provide a novel, small, lightweight and inexpensive suppression control valve device for use with an improved type of self-lapping brake valve device, such as those described in the above-mentioned patents of Harry C. May, whereby an automatic control application of brakes can be effected upon the occurrence of a predetermined control condition, such as an adverse signal indication, and whereby a temporary or permanent suppression or nullification of such an automatic control application of brakes can be manually effected by the engineer.

According to the present invention, a self-lapping engineer's brake valve device of the type described in the above-mentioned Patent No. 2,958,561 for a locomotive fluid pressure brake apparatus and a timing valve device, such as that disclosed in the above-mentioned Patent No. 2,322,042, are connected to a brake application valve device, such as that shown and described in Patent No. 2,982,583, issued May 2, 1961 to Harry C. May, and to a novel suppression control valve device to provide a locomotive fluid pressure brake apparatus for effecting an automatic control application of brakes upon the locomotive and connected cars upon the occurrence of a predetermined control condition, such as an adverse signal indication, and for effecting within a predetermined time a suppression of such an application of brakes by the engineer when deemed proper and safe by him to do so.

More particularly, according to the present invention, there is provided in or for a locomotive fluid pressure braking apparatus the combination comprising a self-lapping type of engineer's brake valve device, a timing valve device operable in response to an adverse signal indication to vent fluid under pressure from one face of a piston of a brake application valve device which is thereby rendered effective to cause a service application of brakes, and a suppression control valve device interposed between the timing valve device and a so-called stop reservoir into which fluid under pressure from the one face of the piston of the brake application valve device is supplied through the suppression control valve device to the stop reservoir to cause a brake applying operation of the brake application valve device.

This invention covers a locomotive fluid pressure braking apparatus including a suppression control valve device which is operative, at the time an adverse signal indication is in effect, by a reduction in brake pipe pressure and by the fluid under pressure vented from the brake pipe effected in response to manual movement of an operating handle of an engineer's brake valve device out of a release position selectively into different application positions to effect the closing of a communication between the timing valve device and the stop reservoir to thereby either temporarily or permanently suppress an automatic control application of brakes on the locomotive and connected cars in the train.

The duration of a temporary suppression effected by the suppression control valve device is proportional to the quantity of fluid under pressure released from the train brake pipe in response to movement of the brake valve handle varying degrees out of a brake release position into a service application zone and also in accordance with the chosen size of a restricted orifice via which such fluid under pressure is vented to atmosphere. Permanent suppression of an automatic train control brake application is effected in response to movement of the brake valve handle beyond the service application zone to any one of three positions, namely, suppression, handle-off, or emergency application position.

In the accompanying drawings:

FIG. 1, FIG. 1A and FIG. 1B, when taken together such that the right-hand edge of FIG. 1 is matched with the left-hand edge of FIG. 1A and the right-hand edge of FIG. 1A is matched with the left-hand edge of FIG. 1B, constitutes a diagrammatic view of a locomotive fluid pressure brake apparatus embodying the invention.

FIG. 2 is an elevational cross-sectional view, at an enlarged scale, of the fluid pressure operated suppression valve device of FIG. 1A showing the structural details of this valve device.

Description

Referring to the drawings, the locomotive fluid pressure brake apparatus embodying the invention comprises a brake pipe 1 that extends from the locomotive back through each car in a train, a brake cylinder device 2, a main reservoir 3, an auxiliary reservoir 4, a control reservoir 5, an engineer's automatic brake valve device 6 for controlling the pressure in brake pipe 1, a brake control valve device 7 connected to the brake pipe 1 and controlled by variations in pressure therein, a brake application valve device 8, a train control or timing valve device 9, a suppression valve device 10 to which is connected a volume reservoir 11, a stop reservoir 12 and a suppression reservoir 13, a cut-out valve device 14 operative to cut out train control when the locomotive is not the lead unit in multiple unit locomotive operation or is a pusher, and a safety control or foot valve device 15.

The engineer's automatic brake valve device 6 may be of the self-lapping type, such as that disclosed in United States Patent No. 2,958,561, issued November 1, 1960 to Harry C. May, and assigned to the assignee of the present application, and in view of this, it is deemed unnecessary to show and describe this device in detail. Briefly, however, the engineer's automatic brake valve device 6 comprises a sectionalized casing 16 containing a relay valve device 17, a self-lapping control valve device 18, a brake pipe cut-off valve device 19, a vent valve device 20, an emergency valve device 21, a suppression valve device 22, an equalizing reservoir cut-off valve device 23, and a manually positionable selector valve device 24 for selectively conditioning the brake apparatus to provide a complete release of brakes for freight service, to provide a graduated release of brakes for passenger service, and to cut out control of brake pipe pressure by the brake valve device 6 for multiple unit or trailing (pusher) unit operation, or for conducting a brake pipe leakage test. Secured to the sectionalized casing by any suitable means (not shown) is an independent brake valve device 25, only a portion of which is shown in the drawings, for permitting the fluid pressure brakes on the locomotive to be applied and released independently of those on the connected cars.

The brake control valve device 7 may be of the graduated release type, such as that disclosed in United States Patent No. 2,937,906, issued May 24, 1960, to Harry C. May and assigned to the assignee of the present application, and in view of this it is deemed unnecessary to show and describe this device in detail. It will, of course, be understood that this device operates upon a service reduction in brake pipe pressure to supply fluid under pressure from the auxiliary reservoir 4 to the brake cylinder 2 to effect a service application of the brakes, upon an emergency reduction in brake pipe pressure to effect an emergency application of the brakes, and upon an increase in brake pipe pressure to effect a release of the brakes, in accordance with the degree to which the brake pipe pressure is restored, as well as the recharging of the brake equipment.

The brake application valve device 8 may be substantially the same as that disclosed in United States Patent No. 2,982,583 of Harry C. May, issued May 2, 1961, and assigned to the assignee of the present application, and in view of this it is deemed unnecessary to describe this device in detail. Briefly, however, the brake application valve device 8 comprises a sectionalized casing containing, in addition to an application valve 26 and a suppression valve 27, a release control valve 28 and a check valve device 29.

The train control or timing valve device 9 may be such as that shown and described in the hereinbefore mentioned Patent No. 2,322,042, and in view of this it is deemed unnecessary to describe this device in detail. It will, of course, be understood from the above-mentioned patent that the timing valve device 9 comprises a magnet valve device 30 operating on a circuit adapted to be controlled by any suitable means (not shown) which are operative in response to favorable and unfavorable track signals and thereby the existing track conditions on a railroad. When the track signal is favorable, the magnet valve device 30 is adapted to be energized. Conversely, when the track signal is unfavorable, the magnet valve device is deenergized.

The timing valve device 9 further comprises a double beat valve 31 contained in a chamber 32 formed in a sectionalized casing section 33 which chamber 32 is connected by a passage and pipe 34 to the suppression valve device 10. The valve 31 is provided with a fluted stem 35 which extends into a chamber 36 also formed in the sectionalized casing section 33, which chamber 36 is connected by a passage and pipe 37 to a chamber 38 formed in a sectionalized casing section 39 of the cut-off valve device 14. The valve 31 also has a hollow stem 40 extending in the opposite direction into a chamber 41 in the casing section 33 which chamber 41 is open to the atmosphere through a vent passage 42.

The chamber 41 is provided at one side of a valve piston 43 which is subject to the biasing force of a spring 43a and which is operatively connected through a resilient connection to the stem 40. This resilient connection comprises a spring 44 disposed within a counterbore 45 formed in a stem 46 that is integral with the valve piston 43 and interposed between the bottom of the counterbore 45 and a collar 47, which is formed on the lower end of the stem 40 and slidably mounted in the upper end of the counterbore 45. A snap ring 48 is inserted in a groove formed in the counterbore 45 and in surrounding relation to the stem 40 on the upper side of the collar 47 to complete the resilient connection between the stem 40 and the valve piston 43.

At the opposite or lower side of the valve piston 43 is a chamber 49 in constant communication with a timing reservoir 50 through a passageway 51 which is also connected through a choke 52 and a ball type check valve 53 arranged in parallel therewith to a chamber 54 in the magnet valve device 30, the check valve being arranged to provide for flow of fluid under pressure in the direction from the chamber 54 to the timing reservoir 50 but to prevent flow therepast in the opposite direction.

It should be further understood, as explained in detail in the hereinbefore-mentioned Patent No. 2,322,042, that the magnet valve device 30 is operative to effect the supply of fluid under pressure at a constant reduced pressure from the outlet of a pressure reducing valve device 55, which is connected to the magnet valve device 30 by a pipe 56, to the chamber 49 and the timing reservoir 50, and the release of fluid under pressure from this chamber and reservoir to atmosphere through a fluid under pressure operated whistle 57 adapted to produce a sound upon the flow of fluid under pressure therethrough.

An inlet of the pressure reducing valve device 55 is connected by a pipe 58 to the main reservoir 3 which may be charged with fluid under pressure by the usual fluid compressors (not shown) which comprises a part of the fluid pressure locomotive brake equipment.

The suppression valve device 10 comprises a pipe bracket 59 that is provided on opposite sides with vertical bolting faces 60 and 61 to which are secured respectively by any suitable means (not shown) a suppression valve portion 62 and a split reduction valve portion 63.

Extending from the vertical bolting face 60 of the pipe bracket 59 through the bracket and opening at a flat surface 64 on the lower side of the bracket, and at right angles to the bolting faces 60 and 61, are ten ports and passageways 65, 66, 67, 68, 69, 70, 71, 72, 73 and 74. The passageways 69 and 72 each have a branch passageway extending through the pipe bracket 59 and opening at the surface of the vertical bolting face 61. Also, opening at the surface of the vertical bolting face 61 and extending therefrom through the pipe bracket 59 and opening at the flat surface 64 on the bracket are three other ports and passageways 75, 76 and 77. Extending through the pipe bracket 59 and opening respectively at the vertical bolting faces 60 and 61 is a passageway 78.

The end of passageway 65 that opens at the flat surface 64 on the bracket 59 is shown closed by a plug 79 but, if desired, the passageway 65 may be connected by a pipe (not shown) to a pressure gage (not shown) to indicate the degree of pressure acting to maintain closed a communication between the pipe 34 which is connected to the timing valve device 9 and the stop reservoir 12, and thereby suppress a train control application of the brakes on the train.

The port and passageway 66 in the pipe bracket 59 is connected by a pipe bearing the same numeral to a passageway (not shown) in the relay valve device 17 of the self-lapping type of engineer's brake valve device 6. This passageway is connected to an exhaust valve chamber of the relay valve device 17, which chamber corresponds to the exhaust valve chamber 37 of the engineer's brake valve device shown in FIG. 1A of the hereinbefore-mentioned Patent No. 2,958,561, and is adapted to be charged with fluid under pressure from the brake pipe 1 whenever the engineer's brake valve device 6 is operated to reduce the pressure in and release fluid under pressure from the brake pipe 1.

The port and passageway 67 in the pipe bracket 59 is connected by a pipe bearing the same numeral to the hereinbefore-mentioned volume reservoir 11.

The port and passageway 68 in the pipe bracket 59 is connected by a pipe bearing the same numeral to a pipe T 80. One outlet of the pipe T 80 is connected by a pipe 81 to a passageway bearing the same numeral in the sectionalized casing of the brake application valve device 8 which passageway leads to a chamber 82 above the hereinbefore-mentioned release control valve 28. The other outlet of the pipe T 80 is connected by a pipe 83 to a passageway bearing the same numeral in the sectionalized casing 16 of the engineer's brake valve device 6. This passageway corresponds to the passageway 103 of the engineer's brake valve device 1 shown in FIG. 1A of the hereinbefore-mentioned Patent No. 2,958,561.

The port and passageway 69 in the pipe bracket 59 is connected by a pipe bearing the same numeral to a corresponding passageway bearing the same numeral in the sectionalized casing of the brake application valve device 8. While the application valve 26 of the brake application valve device 8 occupies its normal position in which it is shown in the drawings, an elongated annular cavity 84 in the periphery of the application valve 26 connects the passageway and pipe 69 to a vent port 85.

The pipe 34 leading from the passageway 34 and chamber 32 in the timing valve device 9 is connected to that end of the passageway 70 in the pipe bracket 59 that opens at the flat surface 64 on the pipe bracket.

The port and passageway 71 in the pipe bracket 59 is connected by a pipe bearing the same numeral to the hereinbefore-mentioned stop reservoir 12.

The port and passageway 72 in the pipe bracket 59 is connected by a pipe bearing the same numeral to a pipe T 86. One outlet of the pipe T 86 is connected by a pipe 87 to a passageway bearing the same numeral in the sectionalized casing 16 of the engineer's brake valve device 6. This passageway corresponds to the passageway 204 of the engineer's brake valve device 1 shown in FIG. 1A of the hereinbefore-mentioned Patent No. 2,958,561. The other outlet of pipe T 86 is connected by a pipe 88 to one inlet connection of a double check valve device 89. The other inlet connection of the double check valve 89 is connected by a pipe 90 to a pipe T 91 that is disposed in a pipe 92 that connects a brake cylinder supply passageway (not shown) in the brake control valve device 7 to the brake cylinder device 2. The outlet connection of the double check valve 89 is connected by a pipe 93 to a passageway bearing the same numeral in the sectionalized casing of the brake application valve device 8. When the suppression valve 27 of the brake application valve device 8 occupies its normal position, in which it is shown in the drawings, an elongated annular cavity 94 in the periphery of the suppression valve 27 connects the passageway and pipe 93 to a central counterbore 95 in the suppression valve 27, this counterbore being open adjacent one end to the cavity 94 by a drilled cross port 95a, and being open at its opposite end to a chamber 96 at the upper side of a piston 97 formed integral with the suppression valve 27. Piston 97 is subject on its opposite side to the force of a spring 98 which is disposed in an annular atmospheric chamber 99 between the lower side of the piston and an annular shoulder 100 formed at the upper end of a counterbore 101 in the sectionalized casing of the brake application valve device 8 in which counterbore the suppression valve 27 is slidably mounted.

The port and passage 73 in the pipe bracket 59 is connected by a pipe bearing the same numeral to a pipe T 102. One outlet of the pipe T 102 isc connected by a pipe 103 to the outlet connection of a check valve device 104. The inlet connection of the check valve device 104 is connected by a pipe 105 to a passageway bearing the same numeral in the sectionalized casing of the brake application valve device 8, which passageway opens at the surface of a bore 106 formed in the sectionalized casing of the brake application valve device 8 and in which bore the application valve 26 is slidably mounted.

The other outlet of the pipe T 102 is connected by a pipe 107 to a passageway bearing the same numeral in the sectionalized casing 16 of the engineer's brake valve device 6. This passageway corresponds to the passageway 208 of the engineer's brake valve device 1 shown in FIG. 1A of the hereinbefore-mentioned Patent No. 2,958,561.

The port and passageway 74 in the pipe bracket 59 is connected by a branch pipe 1a to the brake pipe 1.

The port and passageway 75 in the pipe bracket 59 is connected by a pipe bearing the same numeral to a valve 108. Valve 108 is preferably of the cock type operable by a handle 109 to a passenger position or to a freight position, in which it is shown, to connect pipe 75 to the hereinbefore-mentioned suppression reservoir 13.

When the handle 109 is moved to its passenger position, the suppression reservoir 13 is cut off from pipe and passageway 75. Therefore, during an automatic train control brake application, with the handle 109 in passenger position, a continuous full service reduction rather than an automatic split reduction, as hereinafter explained in detail, will be effected for reasons hereinafter made apparent.

The port and passageway 76 in the pipe bracket 59 is connected by a pipe bearing the same numeral to a pipe T 110. One outlet of pipe T 110 is connected by a pipe 111 to a passageway bearing the same numeral in the sectionalized casing of the brake application valve device 8 which passageway has therein two branch passageways 111a and 111b. The branch passageway 111a opens at the surface of a counterbore 112 formed in the sectionalized casing of the brake application valve 8 in which counterbore the release control valve 28 is slidably mounted. The branch passageway 111b opens into a chamber 113 on the outlet side of the check valve device 29.

The other outlet of the pipe T 110 is connected by a pipe 111c to a passageway bearing the same numeral in the sectionalized casing 16 of the engineer's brake valve device 6. This passageway corresponds to the passageway 84 of the engineer's brake valve device 1 shown in FIG. 1A of the hereinbefore-mentioned Patent No. 2,958,561.

The port and passageway 77 in the pipe bracket 59 is connected by a pipe bearing the same numeral to a coresponding passageway bearing the same numeral in the sectionalized casing of the brake application valve device 8 which coresponding passageway has therein two branch passageways 77a and 77b which open respectively at the surface of bore 106 at vertical spaced-apart locations along the length of the bore. When the application valve 26 of the brake application valve device 8 occupies its normal position in which it is shown in the drawings, an elongated annular cavity 114 in the periphery of the application valve 26 connects the branch passageways 77a and 77b, and passageway and pipe 77 to the vent port 85. The branch passageway 77b is provided with a restriction or choke 115 therein to restrict the rate of flow of fluid under pressure from an equalizing reservoir 116 to a service rate when the application valve 26 is moved upward in a manner hereinafter explained to a position in which another elongated annular cavity 117 in the periphery of the application valve 26 connects the branch passage 77b to a passageway 118 in the sectionalized casing of the brake application valve device 8 which passageway is connected by a pipe bearing the same numeral to the equalizing reservoir 116 and to a branch pipe 118a and a passageway bearing the same numeral in the sectionalized casing 16 of the engineer's brake valve device 6. This passageway corresponds to the passageway 146, 148 of the engineer's brake valve device 1 shown in FIG. 1A of the hereinbefore-mentioned Patent No. 2,958,561.

The suppression valve portion 62 of the suppression valve device 10 comprises a body 119 that is provided on one side thereof with a vertical bolting face 120 that corresponds to the bolting face 60 of the pipe bracket 59 in that opening at the surface of the bolting face 120 are the same number of ports as open at the surface of the bolting face 60, these ports being identically arranged therein and opening from corresponding passageways in the body 119 so that when a gasket 121, provided with ports therein corresponding in number and arrangement to the ports opening at the respective surfaces of bolting faces 60 and 120, is placed between these two bolting faces and the body 119 is rigidly secured to the pipe bracket 59 by bolts or other suitable means (not shown), the passageways 65, 66, 67, 68, 69, 70, 71, 72, 73 and 74 in the pipe bracket 59 extend into corresponding passageways in the body 119.

The passageway 65 extends through the body 119 to a chamber 122 formed in the body at the upper side of a flexible diaphragm 123 which is rigidly clamped around its periphery between the body 119 and a cover 124 which is secured to the body 119 by any suitable means (not shown). The diaphragm 123 and the cover 124 cooperate to form at the lower side of the diaphragm a chamber 125 into which the passageway 69 opens. The diaphragm 123 is operatively connected to a spool type permanent suppression valve 126 by means of a follower 127 that is clamped against the diaphragm 123 by a nut 128 that has screw-threaded engagement with a stem that is formed on the lower end of the permanent suppression valve 126 and extends through the diaphragm 123 and follower 127.

A spring 129, disposed in the chamber 125 and interposed between follower 127 and cover 124, biases the permanent suppression valve 126 to an upper position against a stop 130 formed on the body 119. When the spool type permanent suppression valve 126 occupies its upper position in which it is shown in the drawings, an elongated annular cavity 131 formed in the outer periphery of the permanent suppression valve 126 connects the passageway 70 extending through the pipe bracket 59 and body 119, and to which passageway the pipe 34 from the timing valve 9 is connected, to the passageway and pipe 71 which is connected to the stop reservoir 12.

A branch 71a of the passageway 71 in the body 119 leads to the upper side of a preferably disc-shaped back flow check valve 132 that is normally biased to a seated position by a spring 133. The spring 133 is disposed between the check valve 132 and the cover 124 in a chamber 134 into which opens the passageway 73.

The passageway 66 in the pipe bracket 59 has therein adjacent the bolting face 60 a choke 135 which controls the rate at which fluid under pressure that is vented from the brake pipe 1 by operation of the relay valve device 17 of the engineer's brake valve device 6, when a handle 136 of the brake valve device is moved into an application zone, is supplied through that portion of the passageway 66 extending through the body 119 to the upper side of a second preferably disc-shaped back flow check valve 137. The check valve 137 is normally biased to a seated position by a spring 138 which is disposed in a chamber 139 and interposed between the check valve 137 and the cover 124.

The passageway 67 extends through the body 119 to a chamber 140 formed in the body in which chamber is disposed a spring 141 which is effective to bias a preferably disc-shaped check valve 142 against a valve seat 143 formed at the lower end of a bore 144 in the body 119.

Slidably mounted in the bore 144 is a spool type temporary suppression valve 145. The lower end of the spool valve 145 is provided with a counterbore 146 at the upper end of which is a cross-drilled port that opens to an elongated annular cavity 147 formed in the outer periphery of the spool valve. The upper end of the temporary suppression valve 145 is operatively connected to the center of a flexible diaphragm 148 by means of a pair of followers 149 and 150, disposed respectively on opposite sides of the diaphragm, and a nut 151. The outer periphery of the diaphragm 148 is rigidly clamped between the body 119 and a cover 152 secured to the body by any suitable means (not shown). The diaphragm 148 cooperates respectively with the body 119 and the cover 152 to form on opposite sides of the diaphragm two chambers 153 and 154. Disposed in the chamber 153 in surrounding relation to the valve 145 and between the follower 149 and a shoulder 155 formed on body 119 is a spring 156 which is effective to bias the diaphragm 148 and temporary suppression valve 145 in an upward direction to the position in which they are shown in the drawings in which position the diaphragm follower 150 abuts a stop 157 formed on the cover 152. In this position of the spool type temporary suppression valve 145, the counterbore 146 and the cavity 147 in the outer periphery of the valve 145 open the interior of the bore 144 below the lower end of the valve 145 to atmosphere through a passageway 158 extending from the exterior surface of the body 119 through the body and opening at the surface of the bore 144 opposite the cavity 147.

Opening into the chamber 153 at the lower side of the diaphragm 148 is one branch 74a of the passageway 74 that extends through the body 119 and pipe bracket 59 and is connected to the brake pipe 1 by the branch pipe 1a.

A second branch 74b of the passageway 74 in the body 119 leads to a chamber 159 at the lower or outlet side of preferably a disc-shaped spill-over check valve 160. Disposed between the check valve 160 and the cover 124 is a spring 161 which is effective to normally bias the check valve 160 into seating contact with an annular valve seat 162 formed on the body 119.

A third branch 74c of the passageway 74 in the body 119 opens at the surface of a counterbore 163 formed in the body 119. The passageway and pipe 68 open into the bottom or lower end of the counterbore 163 in which counterbore a piston type charging valve 164 is slidably mounted. A spring 165 is disposed between the upper side of the charging valve 164 and the cover 152 which spring is effective, in the absence of fluid under pressure in passageway 68, to bias the charging valve downward until its lower end contacts the end of counterbore 163.

When the passageway 68 is charged with fluid under pressure in a manner hereinafter described in detail, this fluid under pressure is effective to move the charging valve 164 upward against the yielding resistance of the spring 165 until its upper end abuts the cover 152. In this position of the charging valve 164 in which it is shown in the drawing, an elongated annular cavity 166 formed in the outer periphery of the charging valve establishes a communication between the branch passageway 74c and the hereinbefore-mentioned passageway 78, and between the branch passageway 74c and a passageway 167 formed in the body 119 which passageway 167 leads to the lower side of a preferably disc-shaped charging check valve 168 that is normally biased to a seated position by a spring 169. The spring 169 is disposed between the upper side of the check valve 168 and the cover 152 and in a chamber 170 which is connected by a branch passageway 67a in the body 119 to the passageway 67, and by a passageway 171 in the cover 152 to the chamber 154 above the diaphragm 148.

A fourth branch 74d of the passageway 74 in the body 119 opens at the surface of a counterbore 172 formed in the body 119 coaxial with and extending in a direction opposite that of the counterbore 163. The passageway and pipe 72 open into the upper end of the counterbore 172.

Slidably mounted in the counterbore 172 is a spool type suppression valve 173 which, in the absence of fluid under pressure in the passageway 72, is biased in an upward direction against the upper end of the counterbore 172 by a spring 174 interposed between the suppression valve 173 and the cover 124. The spool type suppression valve 173 is provided with three spaced-apart elongated annular cavities 175, 176 and 177. The suppression valve 173 is also provided with four spaced-apart peripheral annular grooves, one being located at each end of each of the cavities 175, 176 and 177. An O-ring seal is carried in each of these peripheral annular grooves to prevent leakage of fluid under pressure along the spool type suppression valve 173 from one cavity to another or from the passageway 72 to the upper cavity 175. However, an atmospheric exhaust passageway 178 is provided in the body 119 which passageway is effective to release to atmosphere any fluid under pressure that may leak from the passageway 72 past the upper O-ring seal to the cavity 175 or from the cavity 176 to the cavity 175 past the O-ring seal that is disposed between these two cavities.

When, in the absence of fluid under pressure in the passageway 72, the spring 174 biases the suppression valve 173 to its upper position in which it is shown in the drawings, in which position the branch passageway 74d is connected through the cavity 176, a pair of cross drilled ports 179 and a counterbore 180, all three of which are in suppression valve 173, to the lower side of the valve. Also, when the suppression valve 173 occupies its upper position, the cavity 177 therein connects a branch passageway 65a of the passageway 65 to one end of a passageway 181 in the body 119, which pasageway opens at its opposite end at the surface of the bore 144. The passageway 181 has a first branch passageway 181a that leads to the chamber 139, a second passageway 181b that leads to the upper side of the check valve 160 within the annular valve seat 162, and a third branch passageway 181c that leads to a volume 182 formed in the casing 119. The branch passageway 181c is connected to a choke 183 the outlet of which registers with a passageway 184 formed in the cover 152. The passageway 184 is open to the atmosphere through a choke 185 and has a branch passageway 184a that opens to the upper or spring side of the charging valve 164.

The spool type permanent suppression valve 126, the spool type temporary suppression valve 145, and the piston type charging valve 164 are each provided with a plurality of spaced-apart peripheral annular grooves located adjacent the ends of the cavities therein. An O-ring seal is carried in each of the peripheral annular grooves to prevent leakage of fluid under pressure along these valves.

The split reduction valve portion 63 of the suppression valve device 10 comprises a body 186, which like the body 119, is provided on one side thereof with a vertical bolting face 187 that corresponds to the bolting face 61 of the pipe bracket 59, in that opening at the surface of the bolting face 187 are the same number of ports as open at the surface of the bolting face 61, these ports being identically arranged therein and opening from passageways in the body 186. Therefore, when a gasket 188, which is provided with ports therein corresponding in number and arrangement to the ports opening at the respective surfaces of bolting faces 61 and 187, is placed between these two bolting faces, and the body 186 is rigidly secured to the pipe bracket 59 by bolts or other suitable means (not shown), the hereinbefore-mentioned branch passageways of the pasageways 69 and 72, and the passageways 75, 76, 77 and 78 in the pipe bracket 59 extend into the body 186.

The branch passageway 69 extends through the body 186 and opens into the bottom of a counterbore 189 formed in the body. Slidably mounted in the counterbore 189 is a spool type split reduction valve 190 which, in the absence of fluid under pressure in branch passageway 69, is normally biased to its lower position, in which it is shown in the drawings, by a spring 191 that is interposed between the upper end of the valve 190 and a cover 192 that is secured to the upper side of the body 186 by any suitable means (not shown).

The spool type split reduction valve 190 is provided intermediate its ends with two spaced-apart elongated annular cavities 193 and 194 formed in the outer periphery of the valve. Between the two cavities 193 and 194 and between each cavity and the adjacent end of the spool type split reduction valve 190 is a peripheral annular groove. An O-ring seal is carried in each of the peripheral annular grooves to prevent leakage of fluid under pressure along the spool valve 190 from one cavity to another and from each cavity to the adjacent end of the spool valve.

Opening at the surface of the counterbore 189 and arranged in spaced-apart relationship along the length of the counterbore 189 are the passageways 75 and 78 in the body 186 and a third passageway 195 also in the body 186. When the spring 191 biases the split reduction valve 190 to its lower position in which it is shown in the drawings, the O-ring seal between the cavities 193 and 194 closes communication between the passageway 195 and the passageway 75, and the cavity 194 establishes a communication between the passageway 75 and the passageway 78 in order that fluid under pressure may flow from the brake pipe 1 through branch pipe 1a, passageway 74, branch pasageway 74c, annular cavity 166 in charging valve 164 when the charging valve occupies the position in which it is shown in the drawings, passageway 78, cavity 194, passageway and pipe 75 and valve 108, when in the open position, to the suppression reservoir 13 to effect charging of this reservoir from brake pipe 1.

The split reduction valve 63 of the suppression valve device 10 further comprises a movable abutment or diaphragm 196 the outer periphery of which is rigidly clamped between the bottom of the body 186 and a cover 197 secured to the body by any suitable means (not shown). The diaphragm 196 cooperates respectively with the body 186 and the cover 197 to form on opposite sides of the diaphragm two chambers 198 and 199 into the latter of which opens the passageway 195 in the body 186 and also a restricted passageway in an atmospheric choke 200 carried by the cover 197.

Disposed in the chamber 198 at the upper side of diaphragm 196 and in abutting relationship therewith is a diaphragm follower 201 formed on the lower end of a spool type valve 202 that is slidably mounted in a counterbore 203 formed in the lower end of body 186. The diaphragm 196 is normally urged into abutting contact with the cover 197 by a bias spring 204 that surrounds the spool valve 202 and is interposed between the diaphragm follower 201 and a shoulder 205 formed on the body 186.

The spool valve 202 has a central counterbore 202a the bottom of which is connected by a cross drilled port to the chamber 198. The counterbore 202a and the cross drilled port located at the lower end thereof provide a communication between the chamber 198 and the upper end of counterbore 203 in the body 186. The upper end of the counterbore 202 is connected by a passageway 206 extending through the body 186 and the cover 192 to atmosphere. The passageway 206 in the cover 192 has a branch 206a that leads to the upper end of the bore 189 in the body 186. Consequently, the chamber 198 above the diaphragm 196 and also the upper end of the split reduction valve 190 are constantly connected to atmosphere.

The spool type valve 202 is provided intermediate its ends with an elongated annular cavity 207 formed in the outer periphery thereof. On each side of the cavity 207 the spool type valve 202 has a peripheral annular groove in which is carried an O-ring seal to prevent leakage of fluid under pressure from the cavity 207 along the spool valve to the chamber 198 and to the upper end of counterbore 203.

Opening at the surface of the counterbore 203 and arranged in spaced-apart relationship along the length of the counterbore 203 are the passageway 77 and a passageway 208 which extends through the body 186 and opens at its opposite end at the surface of a counterbore 209 formed in the upper end of body 186. While the diaphragm 196 is biased by the spring 204 into contact with the cover 197, the cavity 207 in the spool type valve 202 establishes a communication between the passageways 77 and 208.

The hereinbefore-mentioned branch of passageway 72 that extends through the pipe bracket 59 continues through the body 186 and opens into the bottom of the counterbore 209.

Slidably mounted in the counterbore 209 is a piston type reduction limiting valve 210 which, in the absence of fluid under pressure in the passageway 72, is normally biased into contact with the bottom of counterbore 209 by a spring 211 that is interposed between the upper end of the reduction limiting valve 210 and the cover 192.

The passageway 208 in the body 186 opens at the surface of the counterbore 209 at a point that is located above the upper end of the reduction limiting valve 210 when this valve is biased into contact with the bottom of the counterbore 209 by the spring 211 so that the passageways 77 and 208 are normally open to atmosphere through a passageway 212 extending from the exterior surface of the cover 192 through the cover and opening into the upper end of the counterbore 209 in the body 186.

The reduction limiting valve 210 has two spaced-apart peripheral annular grooves in each of which is carried an O-ring seal to prevent leakage of fluid under pressure from the passageway 72 along the valve to the upper side thereof or to the passageway 208 when the valve 210 is moved to an upper position by fluid under pressure in the passageway 72.

The passageway 208 in the body 186 has a branch passageway 208a that leads to the area within an annular rib or valve seat 213 formed on the body 186 and encircling the end of branch passageway 208a. Arranged coaxially with the annular valve seat 213 is preferably a flat disc type check valve 214 which controls communication between the branch passageway 208a and a chamber 215 in which the check valve 214 is disposed and into which chamber the passageway 76 extending through pipe bracket 59 and body 186 opens. The check valve 214 is normally biased into seating contact with the annular valve seat 213 by a spring 216 interposed between the check valve 214 and the cover 192.

Disposed in the chamber 38 of the cut-off valve device 14 is a poppet type valve 217 which, when in the position in which it is shown in the drawings, opens the chamber 38 to a second chamber 218 in the cut-off valve device 14. The valve 217 is connected by a stem 219 to a diaphragm (not shown). The valve 217 is normally biased to its open position by a spring (not shown) that acts on the lower side of the diaphragm. The valve 217 may be moved to a seated position against an annular valve seat 220 to close communication between chambers 38 and 218 in response to the supply of fluid under pressure to a chamber (not shown) at the upper side of the diaphragm through a pipe and passageway 221 which is connected to a passageway bearing the same numeral in the sectionalized casing 16 of the engineer's brake valve device 6. This passageway corresponds to the passageway 100 of the engineer's brake valve device 1 shown in FIG. 1A of the hereinafter-mentioned Patent No. 2,958,561.

The chamber 218 in the cut-off valve device 14 is connected by a pipe and passageway 222 to a pipe T 223. One outlet of pipe T 223 is connected by a pipe 224 to the outlet connection of a check valve 225 having arranged in parallel therewith a choke 226. The inlet connection of the check valve 225 is connected by a pipe 227 to a timing volume reservoir 228 of a chosen capacity. The other outlet of the pipe T 223 is connected by a pipe 229 to a passageway bearing the same numeral in the sectionalized casing of the brake application valve device 8. This passageway 229 in the sectionalized casing of the brake application valve device 8 has therein two branch passageways 229a and 229b. The branch passageway 229a opens at the surface of the bore 106 in the sectionalized casing of the brake application valve device 8 at a point spaced above the location at which the pipe and passageway 105 opens at the surface of the bore 106. The branch passageway 229b has three branch passageways 229c, 229d and 229e.

The branch passageway 229c extends through the sectionalized casing and opens at the surface of the counterbore 101 adjacent the lower end thereof.

The branch passageway 229d extends through the sectionalized casing and opens into a chamber 230 at the upper side of a diaphragm 231 operatively connected to application valve 26. In addition to fluid under pressure that may be supplied to the chamber 230 at the upper side of diaphragm 231, this side of the diaphragm is also subject to the force of a heavy spring 232 disposed in the chamber 230.

The branch passageway 229e is constantly open via a choke 233 to a pipe and passageway 234 which is connected to one connection of a pipe T 235. A second connection of pipe T 235 is connected by a pipe 236 to a passageway bearing the same numeral in the sectionalized casing 16 of the engineer's brake valve device 6. This passageway corresponds to the passageway 40 of the engineer's brake valve device 1 shown in FIG. 1A of the hereinbefore-mentioned Patent No. 2,958,561. The third connection of the pipe T 235 is connected by a pipe 237 to one connection of another pipe T 238. A second connection of pipe T 238 is connected by a pipe 239 to one outlet connection of a third pipe T 240 which has its other two connections connected respectively to the main reservoir 3 and the reducing valve device 55 by the pipe 58. The third connection of the pipe T 238 is connected by a pipe 241 to the outlet connection of a spring-biased check valve device 242. The inlet connection of the check valve device 242 is connected to the brake pipe 1 by a branch pipe 1b in which is disposed a cut-out cock 243.

If the locomotive equipped with the apparatus of this invention is to be hauled dead in a train, the cut-out cock 243 may be opened whereupon the main reservoir 3 will be charged from the brake pipe 1 via the branch pipe 1b of the brake pipe, cut-out cock 243 in the open position, check valve device 242, pipes 241, 239 and 58 to a pressure less than the normal charged value of brake pipe pressure by an amount equal to the value of the spring bias of check valve device 242.

The passageway 234 in the sectionalized casing of the brake application valve device 8 has a branch passageway 234a which in turn has two branch passageways one of which opens at the surface of the bore 106 at a point spaced above the location at which the passageway 69 opens at the surface of this bore, and the other of which opens into a chamber 244 at the lower side of the diaphragm 231.

Safety control valve device 15 is preferably of the foot-valve type comprising valve means (not shown) controlled by a pedal 245 that is spring biased to a first or elevated position for connecting one end of a pipe 246 to a pipe 247 having therein a restriction or choke 248 and leading to a whistle 249. The other end of the pipe 246 is connected to a passageway bearing the same numeral in the sectionalized casing of the brake application valve device 8. This passageway opens at the surface of the counterbore 101 in the sectionalized casing at a point located just above the point at which the branch passageway 229c opens into this counterbore and below the lower end of the suppression valve 27 when this valve is biased by the spring 98 to its upper position in which it is shown in the drawings. Consequently, fluid under pressure that flows from the main reservoir 3 through the choke 233 to the branch passageways 229a, 229b, 229c and 229d flows from the branch passageway 229c to the passageway and pipe 246 which is connected to the safety control valve device 15. Therefore, the pedal 245 must be maintained depressed against the spring bias into a second position, indicated by dotted lines in the drawings, in order to close the connection between pipes 246 and 247 and thus prevent venting of pipe 246 via whistle 249.

Operation

Assume initially that the apparatus is void of fluid under pressure; that magnet valve device 30 is energized in response to a favorable track signal for establishing a communication between passageway and pipe 56, which is connected to the outlet of reducing valve device 55, and passageway 51 via chamber 54, choke 52, and ball check valve 53 through which fluid under pressure may be supplied to the timing reservoir 50 and chamber 49 to move valve piston 43 and double beat valve 31 to an upper position in which valve 31 closes communication between pipe and passageway 37 and chamber 32 to which pipe and passageway 34 is connected; that the handle 109 of valve 108 is in freight position; that selector valve device 24 of engineer's brake valve device 6 is in a freight position to condition the engineer's brake valve device 6 to control brake control valve device 7 on the locomotive and brake control valve devices of the direct-release type (such as the well-known AB valve) used on the freight cars in the train; that handle 136 of the engineer's brake valve device 6 is in a release position; and that the pedal 245 is spring-biased on an elevated position. Under these conditions, the various components of the apparatus will be in the respective positions in which they are shown in FIGS. 1, 1A and 1B of the drawings, except, in the absence of fluid under pressure in the pipe and passageway 68, the spring 165 will move the charging valve 164 in the suppression valve portion 62 of the suppression valve device 10 downward until the lower end of the charging valve 164 contacts the lower end of the counterbore 163 in the body 119.

Initial Charging

To initially charge the apparatus, the diesel engines are started for operating fluid compressors (not shown) to effect charging the main reservoir 3. Pedal 245 of the safety control valve device 15 must be depressed by the engineer to cut off pipe 246 from the whistle 249 and atmosphere. With pipe 246 thus cut off from atmosphere by the safety control valve device 15 and also by the brake application valve device 8 which occupies the position in which it is shown in the drawings and with pipe and passageway 37 and hence safety control pipe 229 cut off from stop reservoir 12 by double beat valve 31 of timing valve 9, the brake apparatus will be charged in the following manner:

Fluid under pressure will be supplied from main reservoir 3 via pipes 58, 239, 237, pipe and passageway 234, and branch passageway 234a to the chamber 244 at the lower side of the diaphragm 231 of the brake application valve device 8 at a substantially unrestricted rate and will also be supplied via passageway 234, choke 233, branch passageways 229e and 229d to the chamber 230 at the upper side of the diaphragm 231 at a restricted rate controlled by said choke. However, choke 233 is of such flow capacity that despite the more rapid rate of charging of the chamber 244, application valve 26 will remain in its normal position, in which it is shown, during initial charging because the pressure in chamber 244 will not exceed the pressure in chamber 230 by an amount sufficient to overcome the heavy bias of spring 232 and because the lower end of the bore 106 will now be vented via passageway and pipe 105, check valve device 104, pipe 103 and pipe and passageway 107 which, with brake valve handle 136 in release position, is connected to atmosphere by suppression valve device 22 of engineer's brake valve device 6, as explained in detail in the hereinbefore-mentioned Patent No. 2,958,561.

Meanwhile, fluid under pressure will also flow via branch passageway 229b, passageway and pipe 229, pipe T 223, pipe 224, and, at the restricted rate controlled by the choke 226, to the pipe 227 and thence to the timing volume reservoir 228 for charging the latter. Choke 226 is provided so as not to delay effective buildup of pressure in chamber 230. However, the check valve device 225, which is arranged in parallel with choke 226, provides for substantially unrestricted flow from timing volume reservoir 228 to pipe 224 in by-pass of choke 226 under conditions hereinafter to be described.

The fluid under pressure supplied to the pipe 229, as described above, also flows through pipe T 223, and pipe and passageway 222 to the chamber 218 in the cut-off valve device 14. In the absence of fluid under pressure in the pipe 221, the valve 217 will be unseated from seat 220. Consequently, the fluid under pressure supplied to the chamber 218 will flow to the chamber 38 and thence through passageway and pipe 37 to the chamber 36 in the timing valve device 9. Since the valve 31 now closes communication between chambers 36 and 32, as has been previously explained, fluid under pressure cannot flow from the pipe and passageway 37 to the pipe and passageway 34 and thence through the suppression valve device 10 to the stop reservoir 12.

The fluid under pressure supplied from the main reservoir 3 through the choke 233 to the branch passageway 229e flows therefrom via the branch passageway 229c, counterbore 101, and passageway and pipe 246 to the safety control valve device 15, the pedal 245 of which is now held depressed by the engineer to prevent flow to atmosphere via the pipe 247 and whistle 249.

As is explained in detail in the hereinbefore mentioned Patent No. 2,958,561, when the handle 136 of the engineer's brake valve device 6 is in release position, the pipe and passageway 83 will be supplied with fluid under pressure from main reservoir passageway 236. The pipe 83 is connected through the pipe T 80 to pipes and passageways 81 and 68. The pipe and passageway 81 is connected to the chamber 82 above release control valve 28 in the brake application valve device 8. The lower end of the counterbore 112, in which the valve 28 is slidably mounted, is connected by a passageway 250 in the sectionalized casing of the valve device 8 to the lower end of the bore 106 which is now vented to atmosphere, as previously explained. Consequently, the fluid under pressure supplied through pipe and passageway 81 to the chamber 82 will thus positively bias the release control valve 28 to its normal lower position in which it is shown in the drawings.

The fluid under pressure supplied through pipe T 80 to pipe and passageway 68, as explained above, flows into the bottom of counterbore 163 in body 119 of suppression valve portion 62 of suppression valve device 10 and moves the charging valve 164 to its upper position, in which it is shown in the drawings, to effect charging of the volume reservoir 11 and the suppression reservoir 13 from the brake pipe 1 in a manner hereinafter explained in detail.

Also, with the handle 136 of the engineer's brake valve device 6 in its release position, the self-lapping control valve device 18 of the brake valve 6 will be actuated to supply fluid under pressure from the main reservoir passageway 236 to the passageway and pipe 118a and thence through pipe 118 to the equalizing reservoir 116 at a pressure corresponding to a preselected normal charge value which is the same as the pressure supplied to the brake pipe 1 by the relay valve device 17 which, as explained in the hereinbefore-mentioned Patent No. 2,958,561, is operated by equalizing reservoir pressure and brake pipe pressure.

Fluid under pressure supplied to the pipe 118 also flows to the passageway 118 in the sectionalized casing of the brake application valve device 8 and thence through the cavity 117 in the periphery of the application valve 26 to a passageway 251 in the sectionalized casing which opens into a chamber 252 located above the check valve 29 and to another passageway 253, also in the sectionalized casing, which passageway 253 is connected by an annular elongated cavity 254 formed in the outer periphery of the release control valve 28 to the branch passageway 111a that opens into the chamber 113 below the check valve 29 via branch passageway 111b and to which branch passageway 111a the passageway 111 in the sectionalized casing is connected. The passageway 111, when the handle 136 of the engineer's brake valve device 6 is in release position, is also supplied with fluid under pressure from the main reservoir 3 by the self-lapping control valve device 18 via the pipe and passageway 111c, pipe T 110 and pipe 111. Consequently, the fluid under pressure thus supplied to the pipe and passageway 111 can flow via passageway 111a, cavity 254 in release control valve 28, passageway 253, cavity 117 in application valve 26 and passageway and pipe 118 to the equalizing reservoir 116.

The brake control valve device 7 on the locomotive will respond to the charging of the brake pipe 1 by the relay valve device 17 of the engineer's brake valve device 6 to connect the brake cylinder device 2 directly to a brake cylinder release pipe 255 and charge the auxiliary reservoir 4 and control reservoir 5 as explained in the hereinbefore-mentioned Patent No. 2,937,906.

When the charging valve 164 in suppression valve device 10 is moved to its upper position in which it is shown in the drawings by the fluid under pressure supplied to the pipe and passageway 68 from the engineer's brake valve device 6 when the handle 136 thereof occupies its release position, and the brake pipe 1 is charged by the relay valve device 17 of the engineer's brake valve device 6, as explained above, fluid under pressure will flow from the brake pipe 1 via branch pipe 1a, passageway 74, branch passageway 74c, and cavity 166 in the outer periphery of the charging valve 164 to the passageways 78 and 167. The fluid under pressure thus supplied to the passageway 78 flows via the cavity 194 in the periphery of the split reduction valve 190 and passageway and pipe 75 to the suppression reservoir 13, since the valve 108 is now in its open or freight position, as hereinbefore stated, to effect charging this reservoir to normal brake pipe pressure.

The fluid under pressure supplied to the passageway 167 is effective to unseat the check valve 168 against the biasing force of the spring 169 and flow to the chamber 170. Fluid under pressure thus supplied to the chamber 170 flows therefrom via branch passageway 67a, and passageway 67 to the chamber 140 and via passageway and pipe 67 to the volume reservoir 11 to effect charging this reservoir to a pressure that is less than brake pipe pressure by an amount equal to the value of the spring 169.

The fluid under pressure supplied to the chamber 170 also flows via the passageway 171 in the cover 152 to the chamber 154 above the diaphragm 148. Simultaneously with the supply of fluid under pressure to the chamber 154, fluid under pressure is supplied from the brake pipe 1, via pipe 1a, passageway 74, and the branch passageway 74a to the chamber 153 below the diaphragm 148. Consequently, the pressure of the fluid in the chamber 153, together with the force of the spring 156, is effective to maintain the diaphragm follower 150 in contact with the stop 157 and the temporary suppression valve 145 in the position in which it is shown in the drawings in which position the lower end thereof is spaced away from the upper side of check valve 142 to vent the volume 182 and the passageway 181, together with the several branches thereof, to atmosphere via the counterbore 146 and cavity 147 in the temporary suppression valve 145 and the passageway 153 in the body 119. Since the passageway 65 in the body 119 is connected via branch passageway 65a and cavity 177 in the periphery of the suppression valve 173 to the passageway 181, the chamber 122 above the diaphragm 123 is also vented to atmosphere. Consequently, the spring 129 in the chamber 125 beneath the diaphragm 123 is effective to bias the permanent suppression valve 126 to the position in which it is shown in the drawings against the stop 130. In this position of the permanent suppression valve 126, the cavity 131 in the periphery thereof establishes a communication between the passageway 70, which is connected by the pipe 34 to the timing valve 9, and the passageway and pipe 71 which is connected to the stop reservoir 12 and also, via the branch passageway 71a, to the upper inner seated area of the check valve 132.

*Manually Effected Brake Application*

To manually effect a service application of brakes on the locomotive and connected cars of a train, the engineer moves brake valve handle 136 arcuately from its release position into an application zone (extending between release position and a service position) an extent corresponding to the degree of service application desired. As explained in detail in the hereinbefore-mentioned Patent No. 2,958,561, when the brake valve handle 136 is moved into the application zone, the self-lapping control valve device 18 thereof is operated to vent fluid under pressure from the equalizing reservoir 116 via pipe and passageway 118, cavity 117 in the periphery of application valve 26 of brake application valve device 8, passageway 253, cavity 254 in the periphery of release control valve 28, branch passageway 111a, passageway and pipe 111, pipe T 110, pipe and passageway 111c, equalizing cut-off valve device 23 and said control valve device 18 to atmosphere until equalizing reservoir pressure is reduced a corresponding degree. Since the relay valve device 17 of the engineer's brake valve device 6 is operated by equalizing reservoir pressure and brake pipe pressure, as hereinbefore stated, the relay valve device 17 will operate in response to this reduction in equalizing reservoir pressure to effect a corresponding reduction in the pressure in brake pipe 1. The brake control valve device 7 will respond to this reduction in pressure in brake pipe 1 to supply fluid at a corresponding pressure from the auxiliary reservoir 4 to the brake cylinder 2. Furthermore, the brake control valve device (not shown) on each car in the train will likewise respond to this reduction in brake pipe pressure to effect a corresponding degree of brake application on the car.

If the brake valve handle 136 were moved in the application zone to service position, the same connections described above will be established whereupon a full service reduction in equalizing pressure and hence in brake pipe pressure will be effected for causing a full service application of brakes on the entire train.

To manually effect an emergency application of the brakes, the engineer moves the handle 136 to an emergency position. As is explained in hereinbefore-mentioned Patent No. 2,958,561, when the brake valve handle 136 is moved to emergency position, the vent valve device 20 will be opened to vent the brake pipe 1 through a large capacity opening to atmosphere to reduced brake pipe pressure at a rapid rate for thereby causing brake control valve device 7 to provide in the brake cylinder 2 fluid at a higher pressure than obtained during a full service application of brakes. The brake controlling valve devices on the cars will likewise operate to cause a higher pressure to be provided in the brake cylinders on the cars.

*Automatic Effected Brake Application Upon an Unfavorable Track Signal or Traffic Condition*

Assume that, while the apparatus is fully charged, the brake valve handle 136 is in release position and the train is running along a track, the train enters a block where there is an unfavorable track signal indication. This unfavorable signal indication effects deenergization of the magnet valve device 30 of the timing valve device 9. Deenergization of magnet valve device 30 establishes a communication between chamber 54 and the whistle 57 whereupon fluid under pressure will be vented from the chamber 49 and timing reservoir 50 via passageway 51, choke 52, chamber 54 and whistle 57 to atmosphere. The fluid under pressure in the timing reservoir 50 and piston chamber 49 is, therefore, gradually vented through the whistle 57 at a rate controlled by the choke 52 and after a predetermined time interval, determined by the volume of timing reservoir 50 with respect to the flow capacity of choke 52 and the whistle 57, the pressure acting in chamber 49 on valve piston 43 becomes reduced sufficiently for the spring 43a to move valve piston 43 and double beat valve 31 from the position in which they are shown in the drawings downward until valve piston 43 contacts a gasket 256 interposed between two casing sections of the sectionalized casing 33.

With the double beat valve 31 in its lower position, fluid under pressure is vented from chamber 230 in the brake application valve device 8 through branch passageways 229d and 229b, passageway and pipe 229, pipe T 223, pipe passageway 222, chambers 218 and 38, pipe and passageway 37, chamber 36 past the valve 31 to chamber 32 and thence through passageway and pipe 34 leading to the suppression valve device 10 and thence through passageway 70 to cavity 131 in permanent suppression valve 126, which cavity at this time connects the passageway 70 to the passageway 71 and branch passageway 71a. The passageway 71 is connected by the pipe 71 to the stop reservoir 12 and the branch passageway 71a is connected to the upper side of back-flow check valve 132. Consequently, the fluid under pressure vented from the chamber 230 flows into the stop reservoir 12 and also past the check valve 132 to the chamber 134 and thence via passageway and pipe 73, pipe T 102 and pipe 107 to passageway 107 in the sectionalized casing 16 of the engineer's brake valve device 6.

Since the timing volume reservoir 228 is connected via pipe 227, check valve device 225, pipe 224 and pipe T 223 to the pipe 229, fluid under pressure will flow at an unrestricted rate from the timing volume reservoir 228 to the stop reservoir 12 and to the passageway 107 simultaneously with the flow from the chamber 230.

As hereinbefore stated, the passageway 107 in the sectionalized casing 16 of the engineer's brake valve device 6 corresponds to the passageway 208 of the engineer's brake valve device 1 shown in FIG. 1A of Patent No. 2,958,561.

As shown and explained in Patent No. 2,958,561, the passageway 208 is open to atmosphere through suppression valve device 18 of the brake valve device 1 when the brake handle 25 is in release position and all positions in its application zone including service position. Therefore, the fluid under pressure that flows past the check valve 132 will be vented to atmosphere. Fluid under pressure from the chamber 230 in the brake application valve device 8 and timing reservoir 228 is thus simultaneously vented to the stop reservoir 12 and to the atmosphere through the brake valve device 6 now in release position, and when the pressure in chamber 230 is reduced sufficiently below the pressure acting in the chamber 244, the diaphragm 231 and thereby the application valve 26 move upward against the yielding resistance of spring 232 until a diaphragm follower 257 that clamps the diaphragm 231 to the application valve 26 contacts a stop 258 formed on the upper casing section of the sectionalized casing of the brake application valve device 8. Movement of the follower 257 into contact with the stop 258 defines the brake application position of the diaphragm 231 and application valve 26.

In the application position of application valve 26, the lower end of valve 26 uncovers the end of the branch passageway 229a that opens at the surface of the bore 106 whereupon the chamber 230 is connected via branch passageways 229d, 229b, and 229a to the interior of the bore 106 which is now vented to atmosphere via passageway and pipe 105, check valve device 104, pipe 103, pipe T 102 and pipe and passageway 107, which passageway in the brake valve 6 is connected to atmosphere as hereinbefore mentioned. Consequently, fluid under pressure can be vented from the chamber 230 via the communication just described at a faster rate than fluid under pressure can be supplied from the main reservoir 3 through the choke 233 and branch passageways 229e and 229d to chamber 230 so that once the application valve 26 has moved to its application position in response to the unfavorable track signal effecting deenergization of the magnet valve device 30, the engineer cannot suppress a train control application of brakes by moving the brake valve handle 136 into its application zone in a manner hereinafter described.

While the application valve 26 is in its application position, the cavity 84 in the periphery of application valve 26 establishes a communication between the branch passageway 234a and the pipe and passageway 69 whereupon fluid under pressure from the main reservoir 3 flows via pipes 58, 239, 237, 234, passageway 234, branch passageway 234a and cavity 84 to the passageway and pipe 69 which is connected to the passageway bearing the same numeral in the pipe bracket 59.

A branch pipe 259 connects the pipe 69 to a power cut-off device 260. Consequently, the fluid under pressure supplied from the main reservoir 3 to the pipe 69 actuates the cut-off device 260 to effect cutting off the supply of power to the driving motors of the locomotive.

The passageway 69 in the pipe bracket 59 extends through the body 119 to the chamber 125 below the diaphragm 123 which is operatively connected to the permanent suppression valve 126. Consequently, fluid under pressure supplied from the main reservoir 3 to the chamber 125 is effective on the diaphragm 123 to maintain the permanent suppression valve 126 in the position in which it is shown in the drawings in which position the cavity 131 connects the passageway 70 and pipe 34 from the timing valve device 9 to the passageways 71 and 71a which are now connected respectively to the stop reservoir 12 and atmosphere, as hereinbefore explained. This insures that once the magnet valve device 30 is deenergized in response to an unfavorable track signal and the application valve 26 is moved to application position, a full service brake application will be automatically effected and cannot be suppressed.

The branch of the passageway 69 that extends through the pipe bracket 59 and body 186 of the split reduction valve portion 63 opens into the bottom of the counterbore 189 in the body. Therefore, simultaneously with the supply of fluid under pressure from the main reservoir 3 to the chamber 125, fluid under pressure is supplied to the lower side of split reduction valve 190 to move it upward against the yielding resistance of the spring 191 from the position in which it is shown in the drawings to a position in which the cavity 193 in the periphery of the split reduction valve 190 establishes a communication between the pipe and passageway 75 which is connected to the suppression reservoir 13 and the passageway 195 which is connected to the chamber 199 open to atmosphere via the choke 200. Therefore, the fluid under pressure which is stored in the suppression reservoir 13 at nominal brake pipe pressure will flow therefrom to the chamber 199 to deflect diaphragm 196 and move spool valve 202 upward until follower 201 contacts a stop 261 formed on the body 186. In its upper position, the cavity 207 in the periphery of the spool valve 202 closes communication between the pipe and passageway 77 and the passageway 208 and maintains this communication closed until the fluid under pressure in the suppression reservoir 13 is blown down through the choke 200 to a value less than the value of spring 204 acting on the upper side of the diaphragm at which time this spring returns the spool valve 202 to the position in which it is shown in the drawings to reconnect pipe and passageway 77 to passageway 208.

Upon movement of the application valve 26 to its application position, the cavity 117 in the periphery of the application valve cuts off passageway and pipe 118 which is connected to the equalizing reservoir 116 from the passageway 253 and connects passageway and pipe 118 to the passageway 77b whereupon fluid under pressure flows from the equalizing reservoir 116 via pipe and passageway 118, cavity 117, passageway 77b, choke 115, which restricts the flow from the equalizing reservoir to a service rate, to passageway and pipe 77. Since the passageway 77 in the body 186 is now cut off from the passageway 208 by the spool valve 202, the pressure reduction in the equalizing reservoir 116 is limited to a value, such as seven lbs. per square inch, which value is determined by the volume of the passageways 77b, 77a, 77 and pipe 77. This limited reduction in equalizing reservoir pressure is effective to operate the relay valve device 17 of the engineer's brake valve device 6 to reduce the pressure in brake pipe 1, a corresponding amount which reduction in brake pipe pressure operates the brake control valve device 7 on the locomotive and the brake control valve devices on the cars in the train to apply the brakes on the locomotive and cars to a limited degree which is sufficient to cause a gentle gathering of the slack in the train.

Subsequent to the blow down to atmosphere of the pressure in the suppression reservoir 13 through the choke 200 and the return of the spool valve 202 to the position in which it is shown in the drawings in the manner explained above, fluid under pressure will flow from the equalizing reservoir 116 to the passageway 77 in the body 186 via the path described above and thence via the passageway 208, counterbore 209 and passageway 212 in cover 192 to atmosphere. Unless the handle 136 of the engineer's brake valve device 6 is moved out of its release position to suppress a train control brake application, as hereinafter explained in detail, all of the fluid under pressure in the equalizing reservoir 116 will be thus vented to atmosphere and the relay valve device 17 will operate in response to this reduction in equalizing reservoir pressure to correspondingly reduce brake pipe pressure and thereby effect a full service application of brakes on the locomotive and cars in the train.

*Recharging of Brake Pipe Subsequent to Operation of Brake Application Valve Device To Effect a Reduction in Brake Pipe Pressure in Response to an Unfavorable Signal or Traffic Condition*

In order to effect recharging of the brake pipe 1 following a reduction in pressure effected therein by the automatic operation of the brake application valve device 8, the magnet valve device 30 of the timing valve device 9 must be energized in response to a clear track signal indicating favorable traffic conditions so as to close the vent communication between passageway 51 and whistle 57 and reestablish communication between pipe and passageway 56 and passageway 51 to recharge chamber 49 and timing reservoir 50 from the reducing valve device 55. This recharging of the chamber 49 and timing reservoir 50 causes valve piston 43 to move upward to reseat double beat valve 31 in its upper position for closing the communication between pipe and passageway 37 open to the application piston chamber 230 and the passageway and pipe 34 which is connected through the suppression valve device 10 to the stop reservoir 12 and also past the check valve 132 to passageway and pipe 73 which is open to atmosphere via pipe T 102 and pipe and passageway 107 in brake valve device 6 when handle 136 is in release position, as hereinbefore stated.

When double beat valve 31 is thus seated in its upper position, the fluid under pressure supplied from the main reservoir 3 through the choke 233 in brake application valve device 8 to the passageway and pipe 229 can still flow to atmosphere via branch passageway 229a, bore 106, passageway and pipe 105, check valve 104, pipe 103, pipe T 102 and pipe and passageway 107 in brake valve 6. Therefore, the brake valve handle 136 must be moved from its release position to its suppression position in which position, as explained in detail in Patent No. 2,958,561, pipe and passageway 107 is cut off from atmosphere and fluid under pressure is vented from chamber 82 in brake application valve device 8 via pipe and passageway 81, pipe T 80 and pipe and passageway 83 to atmosphere. The fluid under pressure supplied through choke 233 and thence via branch passageways 229c, 229b and 229a to the interior of the bore 106 will flow through passageway 250 to the bottom of counterbore 112 and now move release control valve 28 to an upper position as fluid under pressure is vented from chamber 82 since fluid under pressure cannot flow to atmosphere via pipe and passageway 107 which is closed as explained above.

Subsequent to moving handle 136 to its suppression position to cut off passageway 107 from atmosphere, the fluid under pressure supplied from main reservoir 3 through choke 233 will also flow via branch passageways 229e and 229d to chamber 230 to increase the pressure therein. When the pressure in chamber 230 and the force exerted by the spring 232 is substantially equal to the pressure in the chamber 244, the spring 232 is rendered effective to move the application valve 26 downward to the position in which it is shown in the drawings, in which position the cavity 117 connects pipe and passageway 118 to passageway 253. Since the release control valve 28 is now in its upper position, the passageway 253 is cut off from the branch passageway 111a to prevent recharging the equalizing reservoir 116. Therefore, after the application valve 26 has returned to its lower position in which it is shown in the drawings, it is necessary that the engineer move the brake valve handle 136 from its suppression position back to its release position to reconnect pipe and passageway 107 to atmosphere and supply fluid under pressure from the main reservoir 3 to passageway and pipe 83 which is connected via pipe T 80 and pipe and passageway 81 to chamber 82. Consequently, when the chamber 82 is thus recharged, the release control valve 28 will move downward to its lower position in which it is shown in the drawings since the lower side thereof is now vented via passageway 250, bore 106, passageway and pipe 105, check valve device 104, pipe 103, pipe T 102 and pipe and passageway 107. When the release control valve 28 has returned to its lower position, the cavity 254 in the periphery thereof establishes a communication between branch passageway 111a and passageway 253.

When the brake valve handle 136 is returned to its release position, the self-lapping control valve device 18 will operate, as explained in Patent No. 2,958,561, to supply fluid under pressure from main reservoir 3 to passageway and pipe 111c. Fluid under pressure thus supplied to pipe and passageway 111c will now flow therefrom via pipe T 110, pipe and passageway 111, branch passageway 111a, cavity 254 in the periphery of release control valve 28, passageway 253, cavity 117 in the periphery of application valve 26 and passageway and pipe 118 to the equalizing reservoir 116 to charge this reservoir to a nominal pressure corresponding to the setting of the self-lapping control valve device 18 of the engineer's brake valve device 6.

As the equalizing reservoir 116 is recharged, as explained above, equalizing reservoir pressure is effective to operate the relay valve device 17 to correspondingly recharge the brake pipe 1 to its normal full charged value to operate the brake control valve device 7 on the locomotive to release fluid under pressure from the brake cylinder 2 and to operate the brake control valve devices on the cars in the train to completely release the train control brake application on the entire train.

*Suppression of a Train Control Brake Application by the Engineer*

When a track signal becomes unfavorable and causes deenergization of the timing magnet valve device 30, the track conditions may not be such as to require a full service reduction in pressure in brake pipe 1 and thereby a full service application of brakes on the locomotive and cars of a train and a stopping of the train. Also, any reduction in brake pipe pressure in excess of that actually required represents an undesired and unnecessary loss of fluid pressure and delay in subsequently recharging the brake pipe 1 for releasing the brakes and getting the train in motion again.

In other words, the unfavorable traffic condition may only be momentary and change back to favorable before either a full service reduction in brake pipe pressure has been completed or the train brought to a stop. Under such a condition, it is, therefore, desirable that the engineer be able to promptly release the brakes on the locomotive and train so that the train may continue its trip.

From the hereinbefore-described operation of the brake application valve device 8 in response to an unfavorable traffic condition, it will, however, be remembered that once the brake application valve device moves to its upper or application position, a reduction in brake pipe pressure less than a full service reduction cannot be prevented even though the traffic condition should become favorable before the reduction was completed. This is necessary to insure the safety of the train but under a condition where such a reduction is not required, it is undesirable, as above pointed out.

If the engineer on the locomotive is alert, he may, however, prevent operation of the brake application valve device 8 in response to an unfavorable traffic signal and thus avoid a condition, such as just described, by operating the engineer's brake valve device 6 within a certain time interval after whistle 57 associated with the timing valve device 9 starts to sound, to effect a service reduction in pressure in the brake pipe 1, as will now be described.

Assume now that, while the apparatus is fully charged, the brake valve handle 136 is in release position and the train is running along the track, the train enters a block where there is an unfavorable track signal indication. This unfavorable signal indication effects deenergization of the magnet valve device 30 of the timing valve device 9. Deenergization of magnet valve device 30 establishes a communication between chamber 54 and the whistle 57, whereupon fluid under pressure will be vented from the chamber 49 and timing reservoir 50 via passageway 51, choke 52, chamber 54 and whistle 57 to atmosphere to sound an audible warning to warn the engineer that an "automatic train control application of brakes" will be effected automatically unless he demonstrates his alertness within a predetermined interval of time, such as about six seconds from the time the warning sound commences. This time interval is determined by the capacity of timing volume 50 from which previously stored fluid under pressure will flow via choke 52 and chamber 54 to whistle 57.

If the warning sounds, the engineer must promptly demonstrate his alertness by moving the brake valve handle 136 out of its release position to effect either a temporary suppression or a permanent suppression of an automatic train control application of brakes on the locomotive and connected cars.

*Temporary Supression of a Train Control Brake Application by the Engineer*

In order for the engineer to effect a temporary suppression of a train control brake application, he will, upon sounding of the whistle 57, promptly move the brake valve handle 136 out of its release position and into its application zone, the position in this zone to which the handle is moved determining the length of time the suppression of the automatic train control application continues. Let it be supposed the engineer moves the handle 136 from its release position to a position in its application zone midway between release position and service position.

As the handle 136 is moved from its release position into the application zone, the relay valve device 17 of brake valve device 6 operates to reduce brake pipe pressure, and the pipe and passageway 83 in brake valve device 6 is vented to atmosphere, as described in hereinbefore-mentioned Patent No. 2,958,561. Since pipe 83 is connected to the bottom of the counterbore 163 in body 119 of suppression valve device 10 via pipe T 80, and pipe and passageway 68, spring 165 will move charging valve 164 to its lower position to close communication between brake pipe 1 and volume reservoir 11 and between the brake pipe and the suppression reservoir 13 to trap or bottle up therein fluid under pressure at normal full charge brake pipe pressure.

As hereinbefore stated, one end of pipe 66 is connected to the exhaust valve chamber of the relay valve device 17. Therefore, as fluid under pressure is vented from the brake pipe 1 and the chamber 153 below diaphragm 148 connected to the temporary suppression valve 145 in suppression valve portion 62 of suppression valve device 10 by operation of the relay valve device 17, this fluid under pressure so vented flows through pipe and passageway 66 and choke 135 to the upper side of check valve 137 to unseat this valve against the yielding resistance of spring 138 and flow to chamber 139, thence via branch passageway 181a, passageway 181, cavity 177 in the periphery of suppression valve 173, branch passageway 65a, and passageway 65 to chamber 122 above diaphragm 123 which is connected to permanent suppression valve 126. Fluid under pressure thus supplied to chamber 122 deflects diaphragm 123 downward against the yielding resistance of spring 129 to move the permanent suppression valve 126 downward to a lower position in which the cavity 131 in the periphery thereof cuts off communication between passageway 70, connected by pipe 34 to the timing valve device 9, and passageway and pipe 71 to prevent flow of fluid under pressure from chamber 230 of brake application valve device 8, while magnet valve device 30 is deenergized, and thereby prevent operation of valve device 8 to effect a train control brake application on the train in the manner hereinbefore described.

It will be noted that passageway 181 in the body 119, which passageway opens at the surface of the bore 144 in the body, is connected via branch passageway 181c to the volume 182 in the body 119, and is also connected via choke 183, passageway 184 in cover 152 and choke 185 in the cover to atmosphere.

It should be further noted that when brake pipe pressure in the chamber 153 below diaphragm 148 is reduced by operation of relay valve device 17 of brake valve device 6, fluid under pressure from the volume reservoir 11 that is present in chamber 154 above the diaphragm will deflect this diaphragm downward against the yielding resistance of spring 156 to move the temporary suppression valve 145 downward until the lower end thereof first contacts the check valve 142 and then moves this check valve away from its valve seat 143. When check valve 142 is thus unseated, the volume reservoir 11 is connected via pipe and passageway 67 and the now open check valve 142 to the passageway 181 which is connected to the chamber 122, volume 182 and atmosphere via chokes 183 and 185 in series, as explained above.

The fluid under pressure that flows from choke 183 through passageway 184 in cover 152 to choke 185 flows through branch passageway 184a in the cover 152 to the top of charging valve 164. Since the brake valve handle 136 has been moved out of release position and into its application zone, the passageway 68 opening into the bottom of counterbore 163 is vented to atmosphere, as explained in hereinbefore-mentioned Patent No. 2,958,-561. Therefore, the fluid under pressure supplied through branch passageway 184a, together with the force of the spring 165 will maintain the charging valve 164 in its lower position in contact with the bottom of counterbore 163. When the charging valve 164 occupies its lower position, the end of passageway 78 that opens into the bore 163 is uncovered. Therefore, fluid under pressure will flow from the suppression reservoir 13 via now open valve 108, pipe and passageway 75, cavity 194 in the periphery of split reduction valve 190, passageway 78, bore 163 and branch passageway 184a to passageway 184 in the cover 152. Since the passageway 184 is connected to the chamber 122 via a communication hereinbefore described, it is apparent that the chamber 122 is now being supplied with fluid under pressure from the suppression reservoir 13 and the volume reservoir 11 and also with the fluid under pressure vented from the brake pipe 1 by operation of the relay valve device 17. Also, it is apparent that the fluid under pressure thus supplied to the chamber 122 is at the same time being vented to atmosphere via the chokes 183 and 185 in series. Accordingly, the pressure supplied to the chamber 122 will maintain the permanent suppression valve 126 in its lower position to prevent an automatic train control brake application on the train as long as the relay valve device 17 is venting fluid under pressure from the brake pipe 1 and thereafter until suppression reservoir 13 blows down to atmosphere.

As soon as the initial stage of reduction in pressure in the brake pipe 1 is completed by operation of the relay valve device 17, the pressure in the chamber 153 beneath the diaphragm 148 will cease to be reduced whereupon, when the volume reservoir pressure in the chamber 154 above the diaphragm 148 has fallen via choke 185 to a value slightly less than the brake pipe pressure in the chamber 153, the spring 156 will deflect diaphragm 148 upward to move the temporary suppression valve upward therewith to allow spring 141 to seat check valve 142 on its seat 143 to cut off flow from the volume reservoir 11 to the diaphragm chamber 122 and to atmosphere via chokes 183 and 185 in series. Subsequent to the relay valve device 17 ceasing to vent fluid under pressure from the brake pipe 1 and the reseating of the check valve 142, the fluid under pressure in the chamber 122, the volume 182 and the suppression reservoir 13 will blow down to atmospheric pressure via choke 185, whereupon the spring 129 will move the permanent suppression valve 126 to its upper position to connect chamber 230 in the brake application valve device 8 to the stop reservoir 12 to cause an automatic train control brake application. Consequently, in order to continue to suppress an automatic train control brake application, after the initial stage of reduction in pressure in brake pipe 1 is completed by the operation of the relay valve device 17, the engineer must promptly move the brake valve handle 136 farther into its application zone toward its service position to cause the relay valve device 17 to operate to further vent fluid under pressure from the brake pipe 1 and supply this fluid under pressure so vented through the communication described above to the chamber 122 before the pressure in this chamber has been reduced sufficiently for the spring 129 to move the permanent suppression valve 126 to its upper position.

Fluid under pressure vented from the brake pipe 1 by operation of the relay valve device 17 reduces the pressure in chamber 153 below the lower side of diaphragm 148. Consequently, the temporary suppression valve 145 will respond to this reduction to supply fluid under pressure from volume reservoir 11 to chamber 122 in the manner hereinbefore explained in detail.

Therefore, an automatic train control brake application can be temporarily suppressed as the engineer moves the brake valve handle 136 from its release position into and through its application zone to its service position in which service position a full service brake application is effected in response to a full service brake pipe reduction by operation of the relay valve device 17 of the engineer's brake valve device 6.

If the unfavorable track signal indication has not cleared by the time the engineer has moved the brake valve handle 136 to its service position and he then lets the handle remain in service position, the fluid under pressure in the chamber 122 above diaphragm 123 and in the suppression reservoir 13 will be vented to atmosphere via chokes 183 and 185 in series, whereupon the spring 129 will move the permanent suppression valve 126 to its upper position. When the permanent suppression valve 126 is moved to its upper position, the cavity 131 in the periphery thereof establishes a communication through which fluid under pressure may flow from chamber 230 in the brake application valve device 8 to the stop reservoir 12 through the passageways and pipes hereinbefore described in detail. Consequently, if the engineer leaves the brake handle 136 in its service position and the magnet valve device 30 is still deenergized, the brake application valve device 8 will be moved to its application position. However, movement of the brake valve handle 136 to its service position has already effected a full service application of the brakes on the locomotive and cars in the train. Therefore, movement of the brake application valve device 8 to its application position is ineffective to further increase the pressure in the brake cylinders on the locomotive and the cars in the train and is merely a waste of fluid under pressure. Movement of the brake application valve device 8 to its application position can be prevented and a permanent suppression of an automatic train control brake application accomplished in a manner which will now be described in detail.

It may be noted at this point, however, that if, at this time, the engineer moves the brake valve handle 136 to its release position, the relay valve device 17 will operate in response thereto to supply fluid under pressure to the brake pipe 1 and the chamber 153 below the lower side of diaphragm 148. The fluid under pressure thus supplied to chamber 153 will move the temporary suppression valve upward to the position in which it is shown in the drawings in which check valve 142 is seated by spring 141 to cut off flow from volume reservoir 11 to passageway 181 and the chamber 122, and this passageway and chamber, and also volume 182, are opened to atmosphere via bore 144, counterbore 146 and cavity 147 in temporary suppression valve 145, and passageway 158 in body 119. Therefore, fluid under pressure will be vented from chamber 122 via the just described communication, as well as via choke 185. Consequently, this venting of fluid under pressure from chamber 122 will allow spring 129 to move the permanent suppression valve 126 upward to the position in which it is shown in the drawings to establish a communication between passageways 70 and 71 to effect an automatic train control service brake application in the manner hereinbefore described in detail. Therefore, the engineer cannot prevent or suppress an automatic train control brake application by returning the brake valve handle to its release position.

*Permanent Suppression of a Train Control Brake Application by the Engineer*

If the magnet valve device 30 is still deenergized due to the unfavorable track signal indication when the brake valve handle 136 reaches its service position in response to movement through its application zone to this position by the engineer, he can then effect a permanent suppression of an automatic train control brake application by moving the brake valve handle from its service position to a suppression, handle off, or emergency position beyond the application zone provided he moves the brake valve handle to one of these positions before the pressure in chamber 122 is reduced sufficiently for spring 129 to move the permanent suppression valve 126 to its upper position.

As is explained in detail in hereinbefore-mentioned Patent No. 2,958,561, when the brake valve handle 136 is moved to its suppression, handle off, or emergency position, fluid under pressure is supplied from main reservoir 3 to passageway and pipe 87. The pipe 87 is connected via pipe T 86 and pipe and passageway 72 and the branches thereof respectively to the upper end of counterbore 172 in body 119 of suppression valve portion 62 and the lower end of counterbore 209 in body 186 of split reduction valve portion 63.

The fluid under pressure supplied to the upper end of counterbore 172 is effective to move spool type suppression valve 173 downward against the yielding resistance of spring 174 until the lower end of the suppression valve 173 contacts the cover 124. When the suppression valve 173 occupies its lower position, branch passageway 74d, which is connected via passageway 74 and pipe 1a to brake pipe 1, is connected via cavity 176 in the periphery of suppression valve 173, branch passageway 65a and passageway 65 to the chamber 122 above diaphragm 123. Fluid under pressure will now flow from brake pipe 1 to the chamber 122.

While suppression valve 173 occupies its lower position, branch passageway 65a is no longer connected via cavity 177 in the periphery of suppression valve 173 to passageway 181 which is open to atmosphere via chokes 183 and 185. Therefore, the fluid under pressure now supplied from brake pipe 1 to the chamber 122 is not vented to atmosphere and is, therefore, effective to maintain the permanent suppression valve 126 in its lower position to close communication between passageways 70 and 71 to thereby provide a permanent suppression of an automatic train control brake application as long as the brake valve handle 136 remains in its suppression, handle off, or emergency position since fluid under pressure cannot flow from the chamber 230 in the brake application valve device 8 via the deenergized magnet valve device 30 of the timing valve device 9 to the stop reservoir 12.

The fluid under pressure supplied to the lower end of counterbore 209 is effective to move the reduction limiting valve 210 to its upper position to provide a limited split reduction brake application if the engineer did not move the brake valve handle 136 to its suppression, handle off, or emergency position in time to prevent the brake application valve device 8 moving to its application position.

*Limited Split Reduction Brake Application Upon Belated Movement of Brake Valve Handle to Suppression Position*

Whenever the brake application valve device 8 moves to its application position, the self-lapping control valve device 18 of the engineer's brake valve device 6 is disconnected from the equalizing reservoir 116 since cavity 117 in the periphery of the application valve 26 no longer establishes a communication between pipe and passageway 118 and passageway 253.

As stated in the hereinbefore-mentioned Patent No. 2,958,561, when the brake valve handle 136 is moved to its suppression position, the self-lapping control valve device 18 is conditioned to provide a full service application of brakes on the locomotive and cars in the train.

Belated movement of the brake valve handle 136 by the engineer to its suppression position, following deenergization of magnet valve device 30, is effective to move spool type suppression valve 173 in suppression valve portion 62 to its lower position and the reduction limiting valve 210 in split reduction valve portion 63 to its upper position, as hereinbefore described in detail. However, movement of suppression valve 173 to its lower position is ineffective to now provide a permanent suppression of an automatic train control brake application since the brake application valve device 8 moved to its application position prior to the belated movement of the brake valve handle 136 to its suppression position by the engineer.

As hereinbefore described in detail, when the brake application valve device 8 moves to its application position, spool type valve 202 in split reduction valve portion 63 is moved to its upper position to close communication between pipe and passageway 77 and passageway 208 until the fluid under pressure in the suppression reservoir 13 is blown down to atmosphere through choke 200 in cover 197 to apply the brakes on the locomotive and cars to a limited degree which is sufficient to cause a gentle gathering of the slack in the train.

When the spool type valve 202 is returned to its lower position, communication is reestablished between passageway 77 and passageway 208. Since the reduction limiting valve 210 is now in its upper position, as hereinbefore stated, the fluid under pressure thus supplied to passageway 208 cannot flow into counterbore 209 and thence to atmosphere through passageway 212 in the cover 192 to effect a full service application of brakes in the manner hereinbefore described for a train control brake application of brakes.

As previously stated, the self-lapping control valve device 18 is now conditioned to provide a full service application of brakes.

Therefore, the fluid under pressure supplied to the passageway 208 from passageway 77 will flow via branch passageway 208a to the inner seated area of check valve 214 and unseat this valve against the yielding resistance of spring 216. When check valve 214 is thus unseated, fluid under pressure will flow from branch passageway 208a to the chamber 215 and thence via passageway and pipe 76, pipe T 110, pipe and passageway 111c, equalizing reservoir cut-off valve device 23 to the self-lapping control valve device 18. Fluid under pressure will now flow from the equalizing reservoir 116 via pipe and passageway 118, cavity 117 in the periphery of application valve 26, passageways 77b and 77, pipe 77 and passageway 77 in split reduction valve portion 63, passageways 208 and 208a, chamber 215, passageway and pipe 76, pipe T 110, pipe and passageway 111c and self-lapping relay valve device 18 to atmosphere until equalizing reservoir is reduced to the value required to effect a full service application of the brakes on the locomotive and cars in the train since the relay valve device 17 operates in response to this reduction in equalizing reservoir pressure to effect a corresponding reduction in pressure in brake pipe 1.

From the above, it is apparent that belated movement of the brake valve handle 136 to its suppression position, after the brake application valve device 8 has moved to its application position, subsequent to deenergization of the circuit of the magnet valve device 30 in response to an unfavorable track signal, results in a full service brake application which occurs in two stages or, in other words, a split reduction brake application.

Having now described the invention, what we claim as new and desire to secure by Letters Patent, is:

1. A locomotive brake control apparatus comprising, in combination, a brake pipe normally charged with fluid under pressure, the variations of pressure in which effect brake application and brake release, an equalizing reservoir, a suppression reservoir, a manually operative engineer's brake valve device having a self-lapping control valve means for controlling the pressure in said equalizing reservoir and a self-lapping relay valve means operative by variations in the pressure in said equalizing reservoir to correspondingly control the pressure in said brake pipe, a fluid pressure operated application valve device operable responsively to variation of a control fluid pressure from a normal position, in which it establishes a charging communication via which said equalizing reservoir is charged by said self-lapping control valve means to effect a release of the brakes, to an application position, in which it cuts off the supply of fluid under pressure from said self-lapping control valve means to said equalizing reservoir and establishes a venting communication via which the pressure in said equalizing reservoir is reduced to effect a brake application, means operative in response to a control impulse to effect a variation of the control fluid pressure to cause operation of said application valve device from its normal position to its application position, fluid pressure operated valve means operable by fluid under pressure from said suppression reservoir from a first position, to which it is biased and in which said equalizing reservoir venting communication is open, to a second position in which said equalizing reservoir venting communication is closed, and choke means for venting to atmosphere at a controlled rate fluid under pressure supplied to said fluid pressure operated valve means, said fluid pressure operated application valve device being effective in its application position to cause the establishment of a communication from said suppression reservoir to said fluid pressure operated valve means whereby said fluid pressure operated valve means is moved to and remains in its said second position until the pressure in said suppression reservoir is blown down to a chosen value through said choke means at which time it is restored to its said first position, in consequence of which the flow of fluid under pressure from said equalizing reservoir through said venting communication to atmosphere is so controlled as to effect a two-stage split reduction of the pressure in said equalizing reservoir and thereby to cause a corresponding two-stage split reduction of the pressure in said brake pipe.

2. Locomotive brake control apparatus, as defined in claim 1, further characterized by said manually operative engineer's brake valve device having a handle movable from a release position through an application zone to a service position, and thence to a suppression position, and by valve means disposed in said venting communication on the downstream side of said fluid pressure operated valve means and operable in response to movement of the handle of said engineer's brake valve device to its suppression position to limit the degree of reduction of the pressure in said equalizing reservoir effected by flow through said venting communication incident to the second stage of a split reduction, for correspondingly limiting the degree of brake application resulting from the second stage of the split reduction.

3. Locomotive brake control apparatus, as defined in claim 1, further characterized by said manually operative engineer's brake valve device having a handle movable from a release position through an application zone to a service position, and thence to a suppression position, and by valve means disposed in said venting communication on the downstream side of said fluid pressure operated valve means and operable in response to movement of the handle of said engineer's brake valve device to its suppression position to limit the degree of reduction of the pressure in said equalizing reservoir effected by flow through said venting communication incident to the second stage of a split reduction, for correspondingly limiting the degree of brake application resulting from the second stage of the split reduction, and further including fluid pressure operated means operable by fluid under pressure supplied in response to movement of the handle of said engineer's brake valve device out of its release position into its application zone to prevent variation of the control fluid pressure for said application valve device and thereby to effect suppression of the operation thereof notwithstanding operation of said control impulse responsive means to effect a variation of said control fluid pressure.

4. In a locomotive brake control apparatus having a brake pipe normally charged with fluid under pressure, the variations of pressure in which effect application and release of brakes, an equalizing reservoir, a volume reservoir, a main reservoir, a suppression reservoir, conduit means providing a communication via which fluid under pressure is supplied from said brake pipe to said volume reservoir and said suppression reservoir, a manually operative engineer's brake valve device having a self-lapping control valve means for controlling the pressure in said equalizing reservoir and a self-lapping relay valve means operative by variations in the pressure in said equalizing reservoir to correspondingly control the pressure in said brake pipe, a fluid pressure operated application valve device having a normal position in which it establishes a charging communication via which said equalizing reservoir is charged by said self-lapping control valve means to effect a release of the brakes and movable therefrom to an application position in which it cuts off the supply of fluid under pressure from said self-lapping control valve means to said equalizing reservoir and establishes a venting communication via which said equalizing reservoir is vented to atmosphere to effect an application of brakes, and valve means operative automatically upon a change in track signals to release fluid under pressure from said fluid pressure operated brake application valve device to effect movement thereof from said normal position to said other position, the combination therewith of a first fluid pressure operated valve means having one position in which flow of fluid under pressure may occur through the venting communication from said application valve device to atmosphere and operable to a second position in response to the supply thereto of fluid under pressure from said suppression reservoir in which it prevents flow through the venting communication to atmosphere, a stop reservoir, a second fluid pressure operated valve means operable in response to operation of said relay valve means from one position in which flow of fluid under pressure may occur through a communication between said track signal operated valve means and said stop reservoir to a second position in which it prevents flow through said communication to said stop reservoir, means for supplying to said second fluid pressure operated valve means the fluid under pressure released from said brake pipe in response to operation of said engineer's brake valve device to move said second fluid pressure operated valve means from its one position to its second position, a third fluid pressure operated valve means subject opposingly to the pressure in said volume reservoir and said brake pipe and operative in response to a reduction in the pressure in said brake pipe from one position in which it prevents flow from said volume reservoir to said second fluid pressure operated valve means to a second position in which it effects the supply of fluid under pressure from said volume reservoir to said second fluid pressure operated valve means to move said second fluid pressure operated valve means from its one position to its second position, until the pressure in said volume reservoir is reduced substantially to that in said brake pipe, a charging valve operative in response to manual movement of said engineer's brake valve device out of a release position to cut off charging of said volume reservoir and said suppression reservoir from said brake pipe and to effect the supply of fluid under pressure from said suppression reservoir to said second fluid pressure operated valve means, a first choke means for releasing fluid under pressure from said second fluid pressure operated valve means to atmosphere whereby said second fluid pressure operated means ceases to cut off flow from said track signal operated valve means to said stop reservoir in a predetermined time subsequent to cessation of the supply of fluid under pressure vented from said brake pipe to said second fluid pressure operated valve means, a fourth fluid pressure operated valve means operative from one position in which flow of fluid under pressure may occur through said conduit means to charge said suppression reservoir to a second position responsive to fluid under pressure supplied thereto by said application valve device upon movement to its application position in which it cuts off flow of fluid under pressure from said brake pipe to said suppression reservoir and also establishes a communication via which fluid under pressure from said suppression reservoir flows to said first fluid pressure operated valve means to effect operation thereof to cut off flow of fluid under pressure from said pressure operated application valve device through said venting communication, and a second choke means via which fluid under pressure supplied to said first fluid pressure operated valve means is vented to atmosphere thereby to effect restoration of said first fluid pressure operated valve means to its said one position at the expiration of a certain interval of time, said fluid pressure operated application valve device being effective in its application position to simultaneously supply fluid under pressure from said main reservoir to said second fluid pressure operated valve to nullify the fluid under pressure supplied thereto from said brake pipe, said volume reservoir and said suppression reservoir and from said main reservoir to said fourth fluid pressure operated valve means to effect movement thereof to its second position in consequence of which fluid under pressure flows from said track signal operated valve means to said stop reservoir and a two-stage reduction of pressure in said equalizing reservoir to atmospheric pressure and correspondingly in said brake pipe occurs.

5. In a fluid pressure locomotive brake control apparatus having a brake pipe normally charged with fluid under pressure, the variations of pressure in which effect application and release of brakes, a brake cylinder, a main reservoir, a manually operative engineer's brake valve device having a relay valve means for controlling variations in the pressure in said brake pipe, a brake control valve device operative in response to variations in brake pipe pressure to control the supply of fluid under pressure to and the release of fluid under pressure from said brake cylinder, a fluid pressure operated brake application valve device having a normal position for effecting a release of brakes and movable to another position to effect an application of brakes, and valve means adapted to operate automatically upon a change in track signals to release fluid under pressure from said fluid pressure operated brake application valve device to effect movement thereof from said normal position to said other position, the combination therewith of a stop reservoir, a volume reservoir, a suppression reservoir, a first fluid pressure operated valve means having one position in which flow of fluid under pressure may occur through a communication between said valve means and said stop reservoir and movable to a second position responsive to operation of said relay valve means in which it prevents flow through said communication to said stop reservoir, means for supplying to said first fluid pressure operated valve means the fluid under pressure released from said brake pipe in response to operation of the relay valve means of said engineer's brake valve device, a second fluid pressure operated valve means subject opposingly to the pressure in said volume reservoir and said brake pipe and operative in response to a reduction in the pressure in said brake pipe from one position in which it prevents flow from said volume reservoir to said first fluid pressure operated valve means to a second position in which it effects the supply of fluid under pressure from said volume reservoir to said first fluid pressure operated means until the pressure in said volume reservoir is reduced substantially to that in said brake pipe, conduit means providing a communication via which fluid under pressure is supplied from said brake pipe to charge said volume reservoir and said suppression reservoir, a charging valve operative in response to manual movement of said engineer's brake valve device out of a release position to cut off charging through said conduit means of said volume reservoir and said suppression reservoir from said brake pipe and to effect the supply of fluid under pressure from said suppression reservoir to said first fluid pressure operated valve means, and choke means for releasing fluid under pressure from said first fluid pressure operated valve means to atmosphere whereby said first fluid pressure operated valve means ceases to cut off flow from said track signal controlled valve means to said stop reservoir in a predetermined time subsequent to cessation of the supply of the fluid under pressure vented from said brake pipe to said first fluid pressure operated means.

6. Locomotive brake control apparatus, as defined in claim 5, further characterized in that said locomotive brake control apparatus has a third fluid pressure operated valve means responsive to fluid under pressure supplied thereto by manual operation of said engineer's brake valve device operable to cut off the supply of the fluid under pressure vented from said brake pipe by said brake valve device, the supply of fluid under pressure from said volume reservoir and said suppression reservoir to said first fluid pressure operated valve means, and the venting therefrom through said choke means, and to effect the supply of fluid under pressure directly from said brake pipe to said first fluid pressure operated valve means to maintain said track signal controlled valve means cut off from said stop reservoir so long as said brake pipe is connected directly to said first fluid pressure operated valve means.

7. Locomotive brake control apparatus, as defined in claim 5, further characterized in that said locomotive brake control apparatus has a spring biased check valve operable to provide for flow of fluid under pressure from said charging valve to said volume reservoir and to prevent flow therepast in the opposite direction to isolate said volume reservoir from said suppression reservoir and atmosphere subsequent to restoration of said second fluid pressure operated valve means from its said second position to its said one position in response to cessation of a reduction in the pressure in said brake pipe thereby preventing flow from said volume reservoir during the ensuing release of fluid under pressure from said first fluid pressure operated valve means to atmosphere via said chokes.

8. Locomotive brake control apparatus, as defined in claim 5, further characterized in that said locomotive brake control apparatus has a spring biased check valve operable to provide flow of fluid under pressure from said first fluid pressure operated valve means to said brake pipe and to prevent flow therepast in the opposite direction to insure that the pressure effective to maintain said first fluid pressure operated valve means in its said second position and resulting from the combination of fluid under pressure supplied thereto from said brake pipe, said volume reservoir, and said suppression reservoir cannot exceed the reduced pressure in said brake pipe resulting from manual operation of said engineer's brake valve device to reduce the pressure in said brake pipe thereby varying the time that said first fluid pressure operated valve means prevents flow from said track signal operated valve means to said stop reservoir in accordance with the reduction effected in the pressure in said brake pipe.

9. Control apparatus, as defined in claim 5, further characterized by conduit means providing a communication via which fluid under pressure is suplied from said engineer's brake valve device to said charging valve to effect movement thereof from a cut-off position to a charging position upon manual movement of said engineer's brake valve device to its release position.

10. In a locomotive brake equipment, in combination, a brake pipe normally charged with fluid under pressure, the variations of pressure in which effect application and release of brakes, an equalizing reservoir, an additional reservoir, a brake valve device having a self-lapping control valve means for controlling the pressure in said equalizing reservoir and a self-lapping relay valve means operative by variation in the pressure in said equalizing reservoir to correspondingly control the pressure in said brake pipe, conduit means providing a communication via which fluid under pressure is supplied from said brake pipe to charge said additional reservoir, an application valve device having a normal position in which it establishes a charging communication via which said equalizing reservoir is charged by the self-lapping control valve means and movable therefrom to an application position in which it cuts off the supply of fluid under pressure from the self-lapping control valve means to said equalizing reservoir and establishes a venting communication via which said equalizing reservoir is vented to atmosphere, means for effecting operation of said application valve device from its normal position to its application position, a first fluid pressure operated valve means connected to said application valve device and responsive to pressure in said additional reservoir to move from one position in which it allows flow of fluid under pressure through the venting communication from said application valve device to atmosphere to a second position in which it prevents flow through the venting communication to atmosphere, and a second fluid pressure operated valve means operative from one position in which it allows flow through said conduit means to charge said additional reservoir, responsive to fluid under pressure supplied thereto by said application valve device upon movement to its application position, to a second position in which it cuts off flow of fluid under pressure from the brake pipe through said conduit means to said additional reservoir, and also establishes a communication via which fluid under pressure from said additional reservoir flows to said first fluid pressure operated valve means to effect operation thereof to cut off flow of fluid under pressure from said application valve device through said venting communication to atmosphere, choke means via which fluid under pressure supplied to said first fluid pressure operated valve means from said second fluid pressure operated valve means is vented to atmosphere thereby to effect restoration of said first fluid pressure operated valve means to its said one position at the expiration of a certain interval of time, in consequence of which a two-stage reduction of pressure in said equalizing reservoir to atmospheric pressure and correspondingly in said brake pipe occurs.

11. Locomotive brake equipment, as defined in claim 10, further characterized by a third fluid pressure operated valve means arranged in series with said first fluid pressure operated valve means on the side thereof opposite said application valve device and operative from one position in which the venting communication controlled by said first valve means is open to atmosphere to a second position in response to fluid under pressure supplied thereto by manual operation of said engineer's brake valve device to prevent flow therethrough to atmosphere, and a spring biased check valve connected to said first fluid pressure operated valve means and operable upon the restoration of said first fluid pressure operated valve means to its said one position to provide for flow of fluid under pressure through the venting communication from said application valve device to the self-lapping control valve means of said engineer's brake valve device, the self-lapping control valve means being conditioned by the manual operation of the engineer's brake valve device to reduce to a chosen pressure by venting to atmosphere the fluid under pressure supplied to the self-lapping control valve means in consequence of which a service two-stage reduction in said equalizing reservoir and correspondingly in said brake pipe occurs.

12. In a locomotive brake control apparatus, in combination, a main reservoir, a brake pipe, a fluid pressure operated brake application valve device operable upon a reduction of fluid pressure in a control chamber thereof to effect an application of brakes, track signal valve means operable automatically upon a change in track signals to effect said reduction of fluid pressure in said control chamber to cause operation of said brake application valve device, a manually operative safety control means operable separately from said track signal valve means upon the engineer becoming incapacitated to effect a reduction of fluid pressure in said control chamber to cause the operation of said brake application valve device, fluid pressure operated valve means arranged in series with said track signal valve means and operable upon the supply of fluid under pressure thereto to render said track signal valve means ineffective to cause a reduction of fluid pressure in said control chamber thereby to prevent the operation of said brake application valve device, and a multi-position manually controlled means, and two conduits connecting said multi-position manually controlled means to said fluid pressure operated valve means, said multi-position manually controlled means being effective in one of said positions to supply fluid under pressure from said brake pipe via one of said conduits to said fluid pressure operated valve means and effective in another of said positions to supply fluid under pressure from said main reservoir via the other of said conduits to said fluid pressure operated valve means.

References Cited in the file of this patent
UNITED STATES PATENTS
2,982,583     May _____ May 2, 1961